(12) United States Patent
Sato

(10) Patent No.: US 9,071,294 B2
(45) Date of Patent: Jun. 30, 2015

(54) BASE STATION

(75) Inventor: Yoshizo Sato, Yawata (JP)

(73) Assignee: KYOCERA Corporation, Kyoto (JP)

( * ) Notice: Subject to any disclaimer, the term of this patent is extended or adjusted under 35 U.S.C. 154(b) by 122 days.

(21) Appl. No.: 14/007,600

(22) PCT Filed: Mar. 28, 2012

(86) PCT No.: PCT/JP2012/058152
§ 371 (c)(1),
(2), (4) Date: Sep. 25, 2013

(87) PCT Pub. No.: WO2012/133536
PCT Pub. Date: Oct. 4, 2012

(65) Prior Publication Data
US 2014/0023012 A1    Jan. 23, 2014

(30) Foreign Application Priority Data
Mar. 29, 2011 (JP) .................................. 2011-071389

(51) Int. Cl.
*H04W 4/00* (2009.01)
*H04B 7/04* (2006.01)
*H04W 72/12* (2009.01)
(Continued)

(52) U.S. Cl.
CPC ............. *H04B 7/04* (2013.01); *H04W 72/1247* (2013.01); *H04W 72/10* (2013.01); *H04B 7/0615* (2013.01); *H04B 7/0617* (2013.01); *H04B 7/0854* (2013.01)

(58) Field of Classification Search
CPC .............................. H04W 72/10; H04W 28/10
See application file for complete search history.

(56) References Cited

U.S. PATENT DOCUMENTS 8,055,301 B2    11/2011 Teo et al.
8,086,272 B2    12/2011 Teo et al.
(Continued)

FOREIGN PATENT DOCUMENTS

JP    2008-099079 A    4/2008
JP    2009-60595 A     3/2009
(Continued)

OTHER PUBLICATIONS

International Search Report dated May 22, 2012, issued for International Application No. PCT/JP2012/058152.
(Continued)

*Primary Examiner* — Anez Ebrahim
(74) *Attorney, Agent, or Firm* — Procopio, Cory, Hargreaves & Savitch, LLP

(57) ABSTRACT

A use signal determining section determines the use of a first known signal for array transmission control, when a downlink priority is higher than a threshold value. The use signal determining section determines the use of a second known signal for the array transmission control, when the downlink priority is lower than the threshold value. When the first known signal is used for the array transmission control for a communication terminal performing downlink communication therewith, a scheduling executing section determines to perform uplink communication with the communication terminal. When the second known signal is used for the array transmission control for a communication terminal performing downlink communication therewith, the scheduling executing section determines whether or not to perform uplink communication with the communication terminal by using an uplink priority for the communication terminal.

11 Claims, 16 Drawing Sheets

(51) Int. Cl.
*H04W 72/10* (2009.01)
*H04B 7/06* (2006.01)
*H04B 7/08* (2006.01)

(56) References Cited

U.S. PATENT DOCUMENTS

2010/0069028 A1  3/2010  Choi et al.
2012/0178502 A1  7/2012  Teo et al.

FOREIGN PATENT DOCUMENTS

WO   2008/093952 A2   8/2008
WO   2009/087182 A2   7/2009

OTHER PUBLICATIONS

International Preliminary Report on Patentability issued for International Application No. PCT/JP2012/058152.

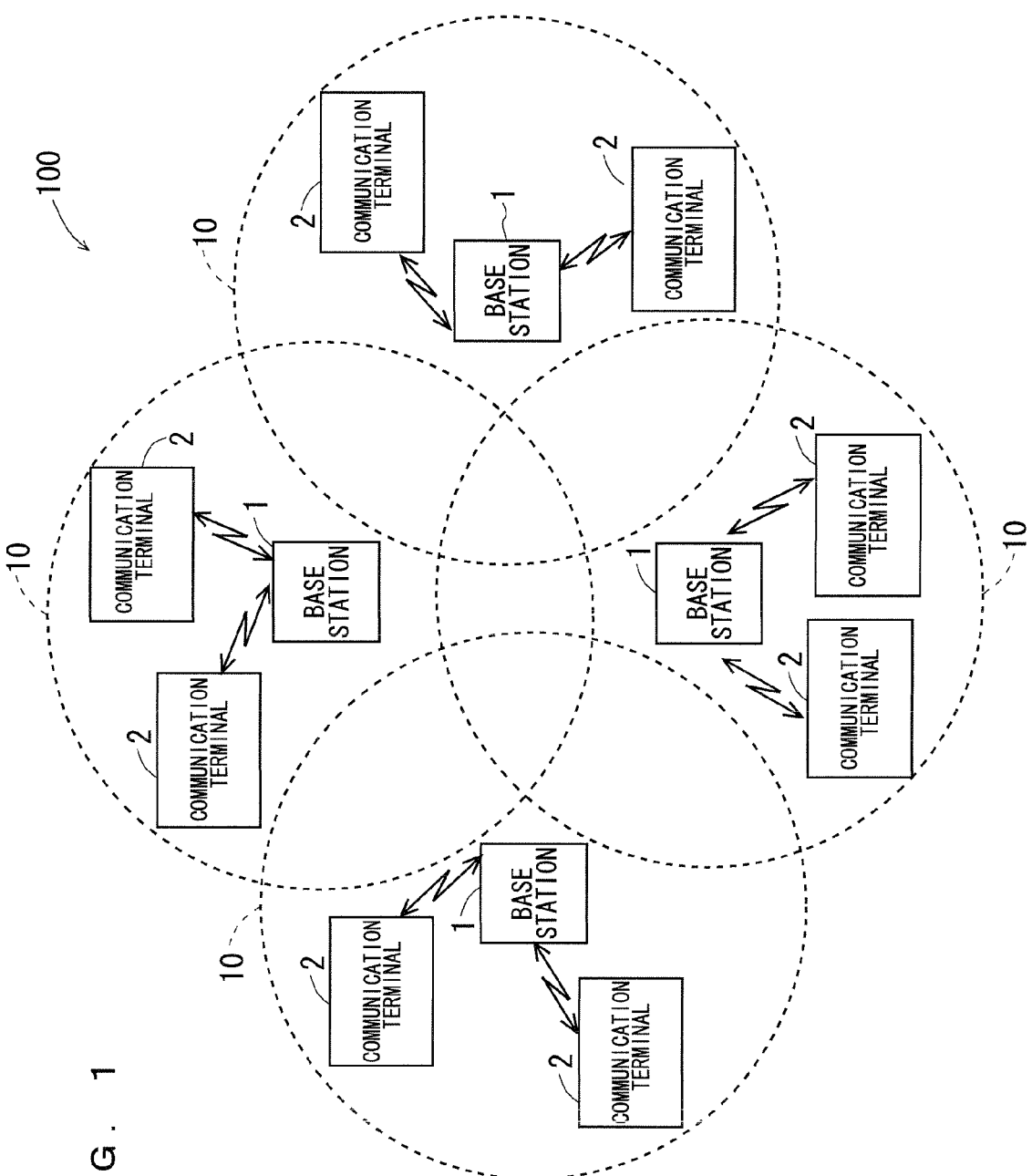
F I G. 1

F I G. 4

| CONFIGURATION NUMBER | SUB-FRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

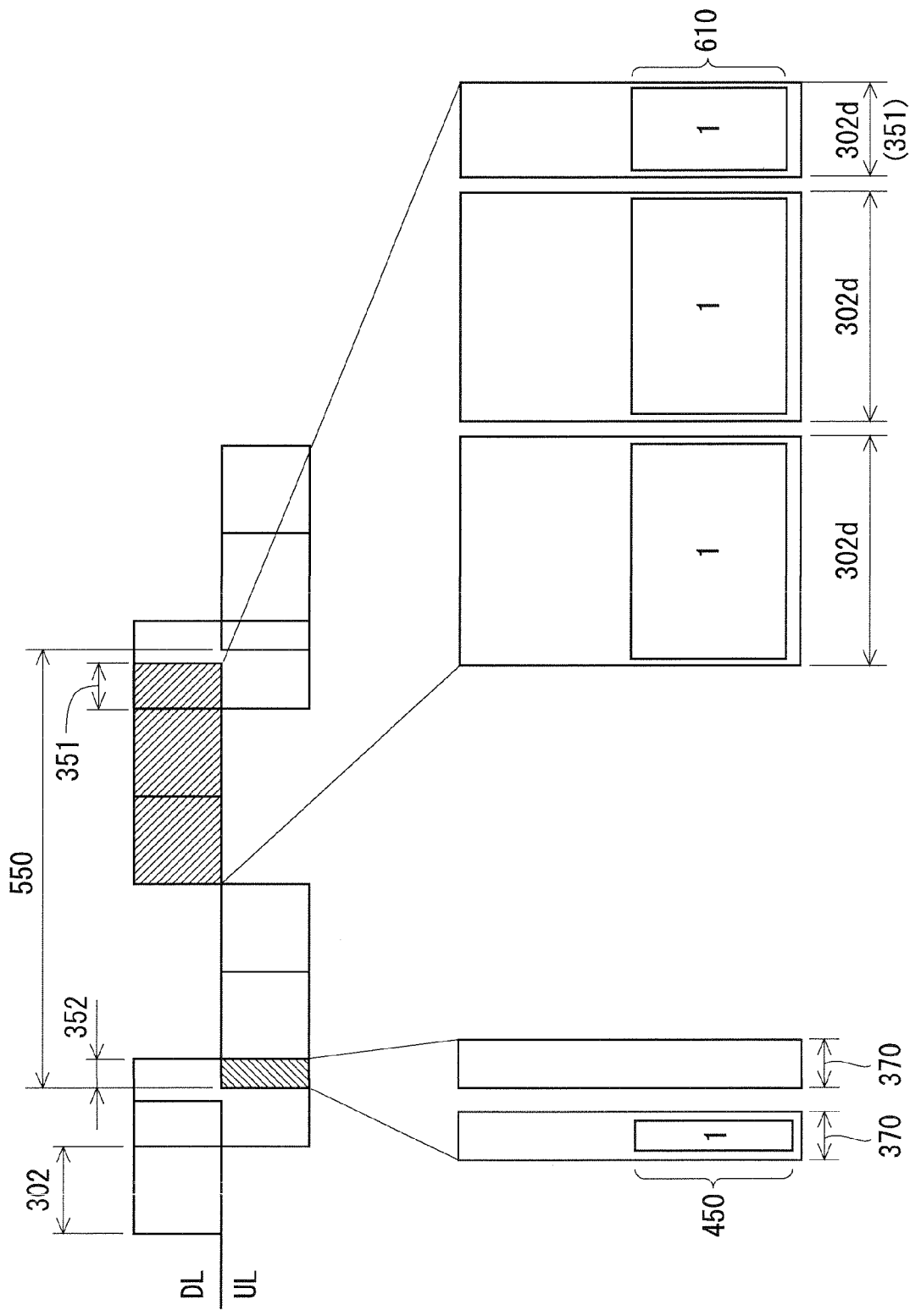

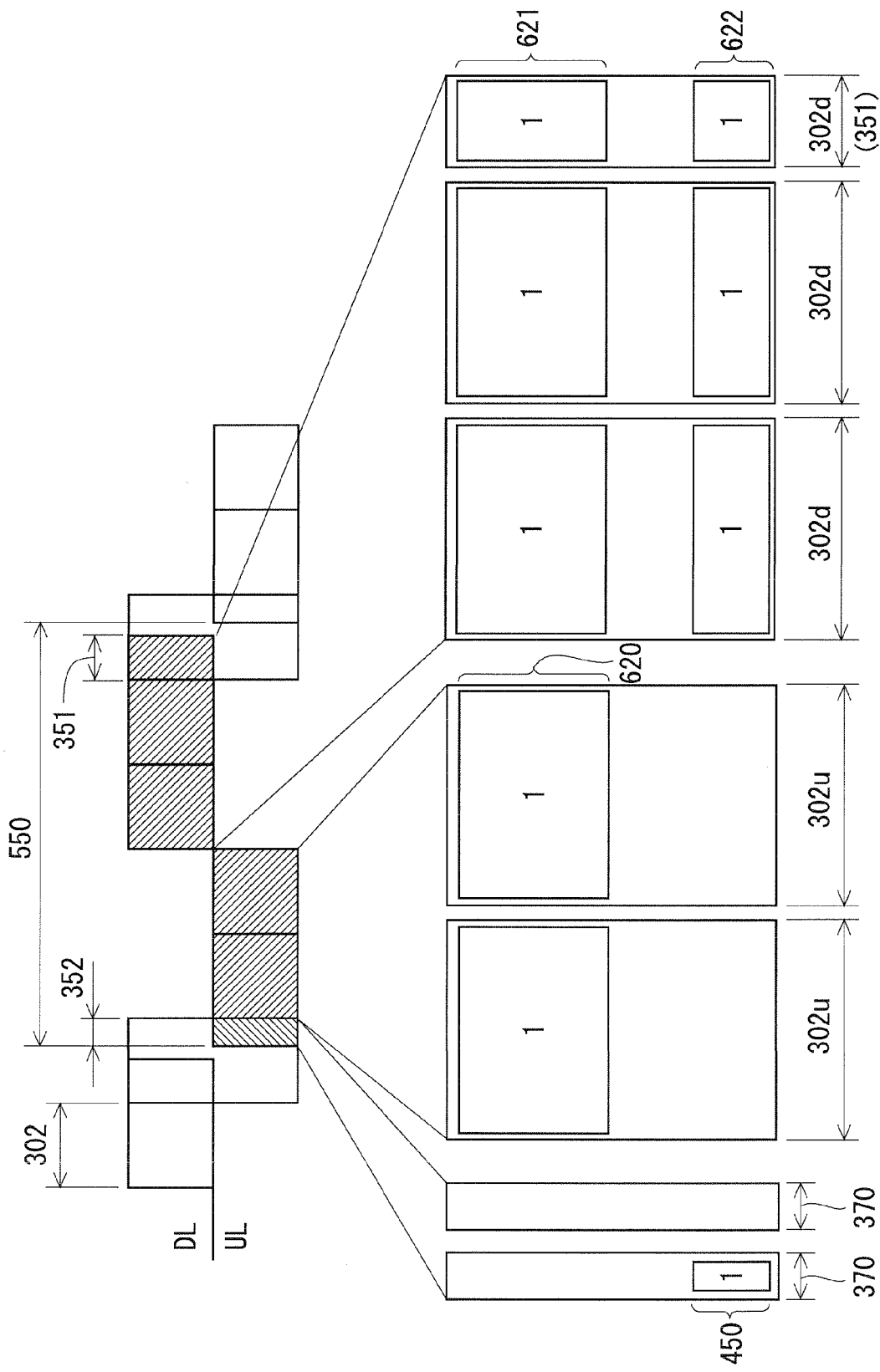

BASE STATION

TECHNICAL FIELD

The present invention relates to a base station which controls the transmission directivity of a plurality of antennas.

BACKGROUND ART

A variety of techniques related to radio communication have been hitherto proposed. A technique related to LTE (Long Term Evolution) is disclosed in Patent Literature 1, for example. LTE is referred to also as "E-UTRA."

CITATION LIST

Patent Literature

Patent Literature 1: Japanese Patent Application Laid-Open No. 2008-099079

SUMMARY OF INVENTION

Technical Problem

In communication systems including LTE and the like, an adaptive array antenna system which adaptively controls the directivity of an array antenna comprised of a plurality of antennas is used in some cases. For transmission of a signal to a communication terminal by using the adaptive array antenna system, a base station controls the transmission directivity of a plurality of antennas, based on known signals from the communication terminal. In communication systems, a plurality of types of known signals are specified as known signals usable for the control of the transmission directivity of a plurality of antennas. For example, a known signal referred to as a "demodulation reference signal (DRS)" and a known signal referred to as a "sounding reference signal (SRS)" are specified in LTE.

When the plurality of types of known signals are specified as the known signals usable for the control of the transmission directivity of a plurality of antennas, the use of each of such types of known signals provides an advantage and a disadvantage in some cases.

In view of the foregoing, it is an object of the present invention to provide a technique capable of selectively using a plurality of types of known signals usable for the control of the transmission directivity of a plurality of antennas with efficiency.

Solution to Problem

According to one aspect of the present invention, a base station for communicating with communication terminals comprises: a communication section for communicating with communication terminals by using a plurality of antennas, the communication section controlling a transmission directivity of the plurality of antennas, based on a known signal from a communication terminal when performing downlink communication with the communication terminal, a scheduling executing section for determining a communication terminal performing uplink communication of data and a communication terminal performing downlink communication of data in a scheduling target time period including an uplink communication time period and a downlink communication time period, and for allocating an uplink radio resource for use in communication with the communication terminal performing uplink communication of data to the communication terminal performing uplink communication of data and allocating a downlink radio resource for use in communication with the communication terminal performing downlink communication of data to the communication terminal performing downlink communication of data, the known signal including first and second known signals, the first known signal being transmitted using part of a data uplink radio resource allocated to the communication terminal as the uplink radio resource which the communication terminal uses for data transmission, the second known signal being transmitted using an uplink radio resource usable for the transmission of the second known signal and determined separately from the data uplink radio resource, a transmission mode determining section for determining the transmission frequency band and the transmission cycle of the second known signal for the communication terminals, and a use signal determining section for determining the known signal which the communication section uses for the control of the transmission directivity of the plurality of antennas in the scheduling target time period from among the first and second known signals, wherein, upon receipt of notification about the transmission frequency band and a transmission cycle of the second known signal from the base station, a communication terminal transmits response data to the notification to the base station, and thereafter transmits the second known signal, based on the transmission frequency band and the transmission cycle, wherein the scheduling executing section determines an uplink priority which is the priority of uplink communication for a communication terminal, and determines a communication terminal performing data uplink communication in the scheduling target time period, based on the uplink priority, wherein the scheduling executing section determines a downlink priority which is the priority of downlink communication for a communication terminal so that the downlink priority increases with an increase in the uplink priority for the communication terminal, and determines a communication terminal performing data downlink communication in the scheduling target time period based on the downlink priority, wherein, when the downlink priority for a communication terminal is higher than a threshold value, the use signal determining section determines the known signal which the communication section uses for the control of the transmission directivity of the plurality of antennas during the downlink communication with the communication terminal in the scheduling target time period as the first known signal, wherein, when the downlink priority for a communication terminal is lower than the threshold value, the use signal determining section determines the known signal which the communication section uses for the control of the transmission directivity of the plurality of antennas during the downlink communication with the communication terminal in the scheduling target time period as the second known signal, wherein, when the first known signal is determined to be used for the control of the transmission directivity of the plurality of antennas for the communication terminal determined to perform downlink communication in the scheduling target time period, the scheduling executing section determines to perform uplink communication with the communication terminal in the scheduling target time period without using the uplink priority for the communication terminal, and wherein, when the second known signal is determined to be used for the control of the transmission directivity of the plurality of antennas for the communication terminal determined to perform downlink communication in the scheduling target time period, the scheduling executing section determines whether or not to perform uplink communication with the communication terminal in the scheduling target time period by using the uplink priority for the communication terminal.

According to another aspect of the present invention, a base station for communicating with communication terminals comprises: a communication section for communicating with communication terminals by using a plurality of antennas, the communication section controlling a transmission directivity of the plurality of antennas, based on a known signal from a communication terminal when performing downlink communication with the communication terminal, a scheduling executing section for determining a communication terminal performing uplink communication of data and a communication terminal performing downlink communication of data in a scheduling target time period including an uplink communication time period and a downlink communication time period, and for allocating an uplink radio resource for use in communication with the communication terminal performing uplink communication of data to the communication terminal performing uplink communication of data and allocating a downlink radio resource for use in communication with the communication terminal performing downlink communication of data to the communication terminal performing downlink communication of data, the known signal including first and second known signals, the first known signal being transmitted using part of a data uplink radio resource allocated to the communication terminal as the uplink radio resource which the communication terminal uses for data transmission, the second known signal being transmitted using an uplink radio resource usable for the transmission of the second known signal and determined separately from the data uplink radio resource, a transmission mode determining section for determining the transmission frequency band and a transmission cycle of the second known signal for the communication terminals, and a use signal determining section for determining the known signal which the communication section uses for the control of the transmission directivity of the plurality of antennas in the scheduling target time period from among the first and second known signals, wherein, upon receipt of notification about the transmission frequency band and the transmission cycle of the second known signal from the base station, a communication terminal transmits response data to the notification to the base station, and thereafter transmits the second known signal, based on the transmission frequency band and the transmission cycle, wherein the scheduling executing section determines an uplink priority which is the priority of uplink communication for a communication terminal, and determines a communication terminal performing data uplink communication in the scheduling target time period, based on the uplink priority, wherein the scheduling executing section determines a downlink priority which is the priority of downlink communication for a communication terminal, and determines a communication terminal performing data downlink communication in the scheduling target time period, based on the downlink priority, wherein, when a communication terminal does not transmit the second known signal having a frequency band higher than a threshold value in the scheduling target time period, the use signal determining section determines the known signal which the communication section uses for the control of the transmission directivity of the plurality of antennas during the downlink communication with the communication terminal as the first known signal, wherein, when a communication terminal transmits the second known signal having a frequency band higher than the threshold value in the scheduling target time period, the use signal determining section determines the known signal which the communication section uses for the control of the transmission directivity of the plurality of antennas during the downlink communication with the communication terminal as the second known signal, wherein, when the first known signal is determined to be used for the control of the transmission directivity of the plurality of antennas for the communication terminal determined to perform downlink communication in the scheduling target time period, the scheduling executing section determines to perform uplink communication with the communication terminal in the scheduling target time period without using the uplink priority for the communication terminal, and wherein, when the second known signal is determined to be used for the control of the transmission directivity of the plurality of antennas for the communication terminal determined to perform downlink communication in the scheduling target time period, the scheduling executing section determines whether or not to perform uplink communication with the communication terminal in the scheduling target time period by using the uplink priority for the communication terminal.

Advantageous Effects of Invention

According to the present invention, the first and second known signals usable for the control of the transmission directivity of a plurality of antennas are selectively used with efficiency.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram showing a configuration of a communication system.

FIG. 4 is a table showing the types of configurations of the TDD frame.

FIG. 15 is a diagram showing an example of the allocation of a downlink radio resource to a communication terminal.

FIG. 16 is a diagram showing an example of the allocation of an uplink radio resource and a downlink radio resource to a communication terminal.

DESCRIPTION OF EMBODIMENTS

Figure 2:
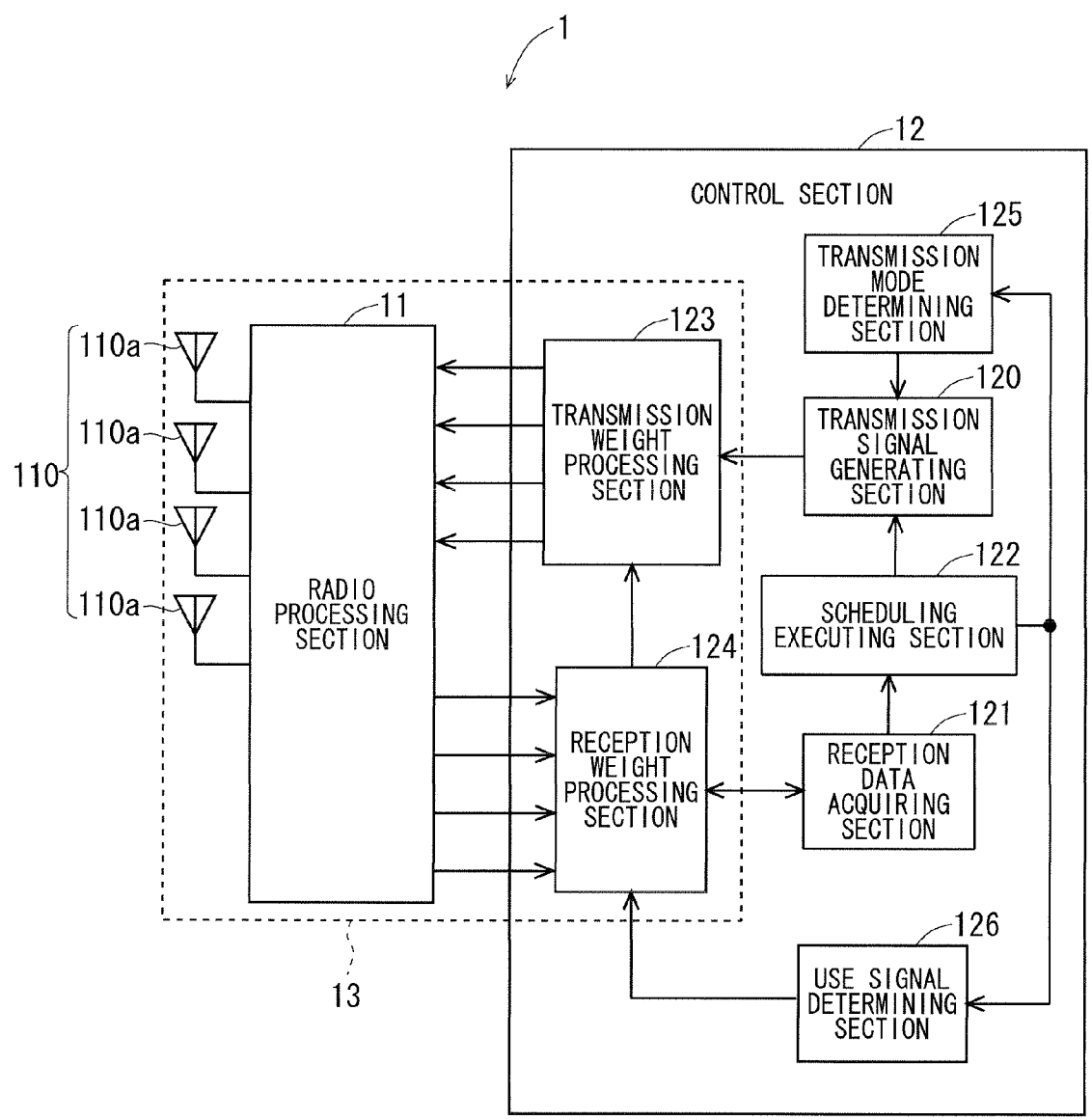
FIG. 2 is a diagram showing a configuration of a base station.

FIG. 1 is a diagram showing a configuration of a communication system 100 according to the present embodiment. This communication system 100 is, for example, LTE in which a TDD (Time Division Duplexing) system is adopted as a duplex system, and includes a plurality of base stations 1. Each of the base stations 1 performs communications with a plurality of communication terminals 2. In LTE, an OFDMA (Orthogonal Frequency Division Multiple Access) system is used for downlink communications, and an SC-FDMA (Single Carrier-Frequency Division Multiple Access) system is used for uplink communications. Thus, the OFDMA system is used for transmission from the base stations 1 to the communication terminals 2, and the SC-FDMA system is used for transmission from the communication terminals 2 to the base stations 1. An OFDM (Orthogonal Frequency Division Multiplexing) signal in which a plurality of subcarriers orthogonal to each other are combined together is used in the OFDMA system.

As shown in FIG. 1, each of the base stations 1 has a service area 10 which partially overlaps the service areas 10 of its neighboring base stations 1. In FIG. 1, there are only two or three neighboring base stations 1 for each of the base stations 1 because only four base stations 1 are shown. In actuality, there are six neighboring base stations 1, for example, for each of the base stations 1.

The plurality of base stations 1 are connected to a network not shown, and are capable of performing communications with each other via the network. A server device not shown is connected to the network, and each of the base stations 1 is capable of performing communications with the server device via the network.

FIG. 2 is a diagram showing a configuration of each base station 1. Such a base station 1 is capable of performing communications with the plurality of communication terminals 2 at the same time by individually allocating radio resources identified by two-dimensions comprised of a time axis and a frequency axis to the communication terminals 2, respectively. The base station 1 includes an array antenna as transmitting and receiving antennas, and is capable of controlling the directivity of the array antenna by using an adaptive array antenna system.

As shown in FIG. 2, the base station 1 includes a radio processing section 11, and a control section 12 for controlling the radio processing section 11. The radio processing section 11 includes an array antenna 110 comprised of a plurality of antennas 110a. The radio processing section 11 performs an amplification process, down-converting, an A/D conversion process and the like on each of a plurality of reception signals received by the array antenna 110 to generate and output a plurality of baseband reception signals.

The radio processing section 11 also performs a D/A conversion process, up-converting, an amplification process and the like on a plurality of baseband transmission signals generated by the control section 12 to generate a plurality of carrier-band transmission signals. The radio processing section 11 then inputs the generated carrier-band transmission signals to the plurality of antennas 110a constituting the array antenna 110, respectively. Thus, the transmission signals are transmitted from the antennas 110a by radio.

The control section 12 includes a CPU (Central Processing Unit), a DSP (Digital Signal Processor), a memory and the like. In the control section 12, the CPU and the DSP execute various programs stored in the memory, so that a plurality of functional blocks are formed which includes a transmission signal generating section 120, a reception data acquiring section 121, a scheduling executing section 122, a transmission weight processing section 123, a reception weight processing section 124, a transmission mode determining section 125, a use signal determining section 126 and the like.

The transmission signal generating section 120 generates transmission data including control data and user data for transmission to a communication terminal 2 as a communication target. The transmission signal generating section 120 then generates the baseband transmission signals including the generated transmission data. The generated transmission signals are equal in number to the antennas 110a constituting the array antenna 110.

The transmission weight processing section 123 sets a plurality of transmission weights for controlling the transmission directivity of the array antenna 110 respectively to the plurality of transmission signals generated by the transmission signal generating section 120. The transmission weight processing section 123 then performs an inverse discrete Fourier transform (IDFT) and the like on the plurality of transmission signals to which the respective transmission weights are set, and thereafter outputs the plurality of transmission signals to the radio processing section 11.

The reception weight processing section 124 performs a discrete Fourier transform (DFT) on the plurality of reception signals inputted from the radio processing section 11, and thereafter sets a plurality of reception weights for controlling the reception directivity of the array antenna 110 respectively to the plurality of reception signals. Then, the reception weight processing section 124 combines the plurality of reception signals to which the respective reception weights are set together to form a new reception signal.

The reception data acquiring section 121 performs an inverse discrete Fourier transform, a demodulation process and the like on the new reception signal generated by the reception weight processing section 124 to obtain the control data and the user data included in the reception signal. The control data and the user data are hereinafter referred to collectively and simply as "data" in some cases.

The radio processing section 11, the transmission weight processing section 123 and the reception weight processing section 124 in the base station 1 according to the present embodiment constitute a communication section 13 for performing communications with the plurality of communication terminals 2 while adaptively controlling the directivity of the array antenna 110. When performing communications with the communication terminals 2, the communication section 13 controls the reception directivity and the transmission directivity of the array antenna 110. Specifically, the communication section 13 adjusts the reception weights by which the reception signals are multiplied in the reception weight processing section 124 to thereby set the beam and null of the reception directivity of the array antenna 110 in various directions. Also, the communication section 13 adjusts the transmission weights by which the transmission signals are multiplied in the transmission weight processing section 123 to thereby set the beam and null of the transmission directivity of the array antenna 110 in various directions. The transmission weights may be determined from the reception weights, and the reception weights may be determined based on the known signals from the communication terminals 2.

The scheduling executing section 122 allocates to each communication terminal 2 as a communication target a downlink radio resource (a transmission frequency and a transmission time period) for use in the transmission of data to each communication terminal 2 as a communication target. The transmission signal generating section 120 generates a transmission signal including data to be transmitted to a communication terminal 2, based on the downlink radio resource allocated to the communication terminal 2 by the scheduling executing section 122, and inputs the transmission signal to the transmission weight processing section 123 at a time based on the downlink radio resource. Thus, the transmission signal including the data to be transmitted to the communication terminal 2 is transmitted from the communication section 13 by using the downlink radio resource allocated to the communication terminal 2. The transmission signal generating section 120 generates and outputs a transmission signal including the control data for notifying the communication terminal 2 about the downlink radio resource allocated to the communication terminal 2 by the scheduling executing section 122. This allows the communication terminal 2 to know the downlink radio resource to be used in the transmission of data thereto, thereby receiving data from the base station 1 thereto appropriately.

Also, the scheduling executing section 122 allocates to each communication terminal 2 as a communication target an uplink radio resource for use in the transmission of data from each communication terminal 2 as a communication target to the base station 1. The transmission signal generating section 120 generates and outputs a transmission signal including control data for notifying a communication terminal 2 about the uplink radio resource allocated to the communication terminal 2 by the scheduling executing section 122. This allows the communication terminal 2 to know the uplink radio resource to be used in the transmission of data to the base station 1, thereby transmitting the data to the base station 1 by radio by using the uplink radio resource.

The transmission mode determining section 125 determines a transmission mode (a transmission frequency band and a transmission cycle) of a sounding reference signal (SRS) to be described later which is a known signal transmitted from the communication terminals 2. The transmission signal generating section 120 generates and outputs a transmission signal including control data for notifying a communication terminal 2 about the transmission mode of the SRS to be transmitted by the communication terminal 2 which is determined by the transmission mode determining section 125. This allows the communication terminal 2 to know the transmission mode (the transmission frequency band and the transmission cycle) of the SRS to be transmitted therefrom, thereby transmitting the SRS to the base station 1, based on the transmission mode.

In regard to each communication terminal 2 as a communication target, the use signal determining section 126 determines a known signal which is used in controlling the transmission directivity of the array antenna 110 when the communication section 13 performs downlink communication with the communication terminal 2, the known signal being included among the SRS usable for the control of the transmission directivity of the array antenna 110 and a demodulation reference signal (DRS) to be described later. When performing downlink communication with a communication terminal 2, the communication section 13 calculates the transmission weight, based on the known signal determined to be used among the SRS and the DRS by the use signal determining section 126, and controls the transmission directivity of the array antenna 110 by using the transmission weight. The control of the transmission directivity of the array antenna 110 is hereinafter referred to as "array transmission control" in some cases.

<Configuration of TDD Frame>

Next, a TDD frame 300 for use between the base station 1 and the communication terminals 2 will be described. The TDD frame 300 is identified by two-dimensions comprised of a time axis and a frequency axis. The frequency bandwidth (system bandwidth) of the TDD frame 300 is 10 MHz, for example, and the time length of the TDD frame 300 is 10 ms. The base station 1 determines the uplink radio resource and downlink radio resource to be allocated to each of the communication terminals 2, based on the TDD frame 300.

Figure 3:
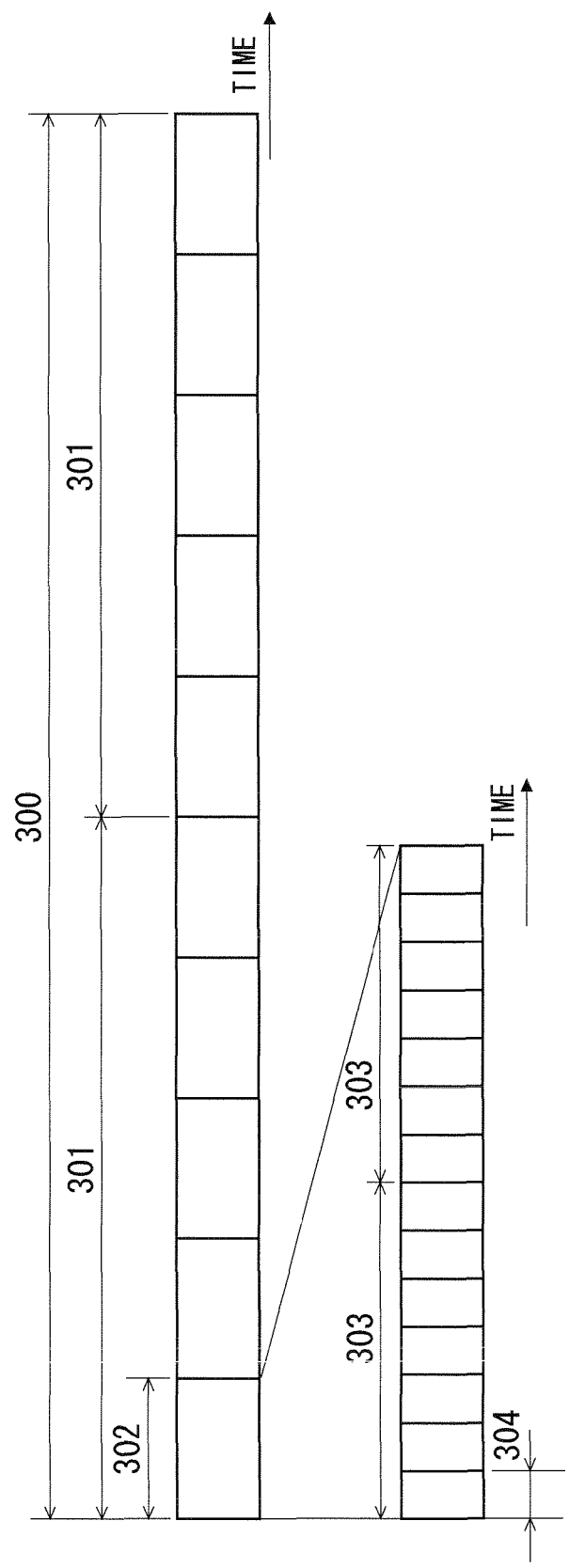
FIG. 3 is a diagram showing a configuration of a TDD frame.

FIG. 3 is a diagram showing a configuration of the TDD frame 300. As shown in FIG. 3, the TDD frame 300 is comprised of two half frames 301. Each of the half frames 301 is comprised of five sub-frames 302. That is, the TDD frame 300 is comprised of ten sub-frames 302. The time length of each of the sub-frames 302 is 1 ms. The ten sub-frames 302 constituting the TDD frame 300 are hereinafter referred to as zeroth to ninth sub-frames 302 in order from the leading end in some cases.

Each of the sub-frames 302 includes two slots 303 arranged in a time direction. Each of the slots 303 is comprised of seven symbol periods 304. Thus, each of the sub-frames 302 includes 14 symbol periods 304 arranged in a time direction. Such a symbol period 304 serves as one symbol period for an OFDM symbol in the downlink communication of the OFDMA system, and serves as one symbol period for a DFTS (Discrete Fourier Transform Spread)-OFDM symbol in the uplink communication of the SC-FDMA system.

The TDD frame 300 having the aforementioned configuration includes a sub-frame 302 for uplink communication only, and a sub-frame 302 for downlink communication only. The sub-frame 302 for uplink communication only is referred to as an "uplink sub-frame 302u" and the sub-frame 302 for downlink communication only is referred to as a "downlink sub-frame 302d" hereinafter. The communication terminals 2 transmit data to the base station 1 in the uplink sub-frames 302u, and the base station 1 transmits data to the communication terminals 2 in the downlink sub-frames 302d.

In LTE, a region (radio resource) of the TDD frame 300 which includes a frequency bandwidth of 180 kHz in a frequency direction and includes seven symbol periods 304 (one slot 303) in a time direction is referred to as a "resource block (RB)." The resource block includes 12 subcarriers. When allocating an uplink radio resource which a communication terminal 2 uses for the transmission of data to the communication terminal 2 or when allocating a downlink radio resource for use in the transmission of data to a communication terminal 2 to the communication terminal 2, the scheduling executing section 122 allocates the uplink radio resource or the downlink radio resource to the communication terminal 2 in units of two consecutive resource blocks, i.e. for each sub-frame 302, in the time direction and in units of one resource block in the frequency direction. When a plurality of resource blocks are allocated in the frequency direction to a communication terminal 2 in one slot 303 of an uplink sub-frame 302u, a plurality of resource blocks consecutive in the frequency direction are allocated to the communication terminal 2 because the SC-FDMA system is used in the uplink communication.

In LTE, seven types of configurations of the TDD frame 300 are specified which differ from each other in combination of the uplink sub-frames 302u and the downlink sub-frames 302d. FIG. 4 is a table showing the seven types of configurations.

As shown in FIG. 4, zeroth to sixth configurations of the TDD frames 300 are specified in LTE. In this communication system 100, one of the seven types of configurations is used. In FIG. 4, the sub-frames 302 denoted by "D" mean the downlink sub-frames 302d, and the sub-frames 302 denoted by "U" mean the uplink sub-frames 302u. Also, the sub-frames 302 denoted by "S" mean sub-frames 302 in which switching from the downlink communication to the uplink communication is done in the communication system 100. The sub-frames 302 of this type are referred to as "special sub-frames 302."

For example, in the TDD frame 300 having the zeroth configuration, the zeroth and fifth sub-frames 302 are the downlink sub-frames 302d, the second to fourth sub-frames 302 and the seventh to ninth sub-frames 302 are the uplink sub-frames 302u, and the first and sixth sub-frames 302 are the special sub-frames 302. Also, in the TDD frame 300 having the fourth configuration, the zeroth sub-frame 302 and the fourth to ninth sub-frames 302 are the downlink sub-frames 302d, the second and third sub-frames 302 are the uplink sub-frames 302u, and the first sub-frame 302 is the special sub-frame 302.

Figure 5:
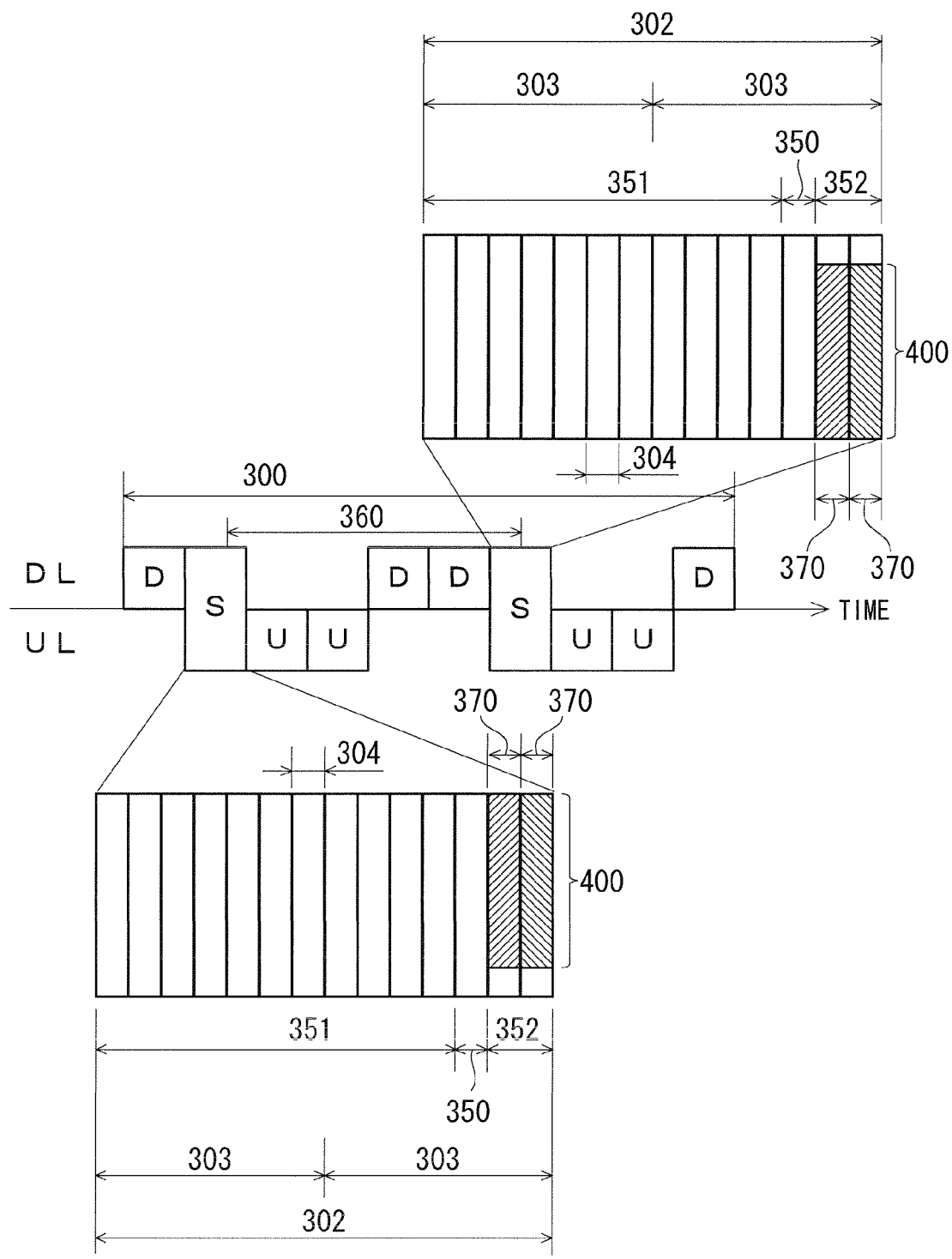
FIG. 5 is a diagram showing the details of the configuration of the TDD frame.

FIG. 5 is a diagram showing the details of the configuration of the TDD frame 300 having the first configuration. As shown in FIG. 5, a special sub-frame 302 includes a downlink pilot time slot (DwPTS) 351, a guard time (GP) 350, and an uplink pilot time slot (UpPTS) 352. The guard time 350 is a no-signal time period required for the switching from the downlink communication to the uplink communication, and is not used for communications. In the following description, the TDD frame 300 having the first configuration shall be used in the communication system 100.

A plurality of types of combinations of time lengths of the downlink pilot time slot 351, the guard time 350 and the uplink pilot time slot 352 are specified in LTE. In the example of FIG. 5, the time length of the downlink pilot time slot 351 is set to 11 symbol periods 304, and the time length of the uplink pilot time slot 352 is set to 2 symbol periods 304.

In the communication system 100 according to the present embodiment, the downlink communication is allowed to be performed not only in the downlink sub-frame 302d but also in the downlink pilot time slot 351 of the special sub-frame 302. Also in this communication system 100, the uplink communication is allowed to be performed not only in the uplink sub-frame 302u but also in the uplink pilot time slot 352 of the special sub-frame 302.

In the present embodiment, the base station 1 transmits data to a communication terminal 2 in each of the symbol periods 304 of the downlink pilot time slot 351. Each of the communication terminals 2 transmits a known signal referred to as the SRS in one of the two symbol periods 304 of the uplink pilot time slot 352. The SRS is comprised of a plurality of complex symbols which modulate a plurality of subcarriers. In the present embodiment, the SRS transmitted in the uplink pilot time slot 352 is used for calculation of the transmission weight. In other words, the communication section 13 in the base station 1 is capable of array transmission control, based on the SRS transmitted by the communication terminal 2 in the uplink pilot time slot 352.

It should be noted that the SRS can be transmitted in the last symbol period 304 of the uplink sub-frame 302u. In other words, the communication terminals 2 are able to transmit data in each of symbol periods 304 other than the last symbol period 304 and to transmit the SRS in the last symbol period 304, in the uplink sub-frame 302u. For the array transmission control, the SRS transmitted in the last symbol period 304 of the uplink sub-frame 302u may be used, but the SRS transmitted in the uplink pilot time slot 352 shall be used in the present embodiment. The SRS shall mean the SRS transmitted using the uplink pilot time slot 352 hereinafter unless otherwise specified. Each of the symbol periods 304 included in the uplink pilot time slot 352 is referred to as an "SRS transmission symbol period 370."

The SRS is a cyclically transmitted signal, and a length (transmission interval) of the transmission cycle of the SRS can be changed. The transmission cycle of the SRS is referred to hereinafter as an "SRS transmission cycle 360." In the example of FIG. 5, the length (transmission interval) of the SRS transmission cycle 360 is set to 5 ms, and the SRS is transmitted in each uplink pilot time slot 352 of the uplink special sub-frame 302.

In this manner, the uplink radio resource (part of the special sub-frame 302 including the uplink pilot time slot 352 and part of the uplink sub-frame 302u including the last symbol period 304) in which the SRS can be transmitted is determined in the communication system 100 according to the present embodiment besides the uplink radio resource (part of the uplink sub-frame 302u except the last symbol period 304) usable when the communication terminals 2 transmit data.

<Transmission Frequency Band of SRS>

In this communication system 100, frequency bands 400 (referred to hereinafter as "SRS transmittable bands 400") usable for the transmission of the SRS are disposed alternately on the high frequency side and on the low frequency side of a system band for each SRS transmission cycle 360. The SRS transmittable bands 400 are diagonally shaded in FIG. 5.

In the communication system 100 according to the present embodiment, a frequency band (referred to hereinafter as an "SRS transmission band 450") used by a communication terminal 2 for the transmission of the SRS is allowed to change for each SRS transmission cycle 360 within the entire or partial range of the SRS transmittable bands 400. Such control is referred to as "frequency hopping." The bandwidth (referred to hereinafter as an "SRS transmission bandwidth") of the SRS transmission band 450 is variable in this communication system 100.

Figure 6:
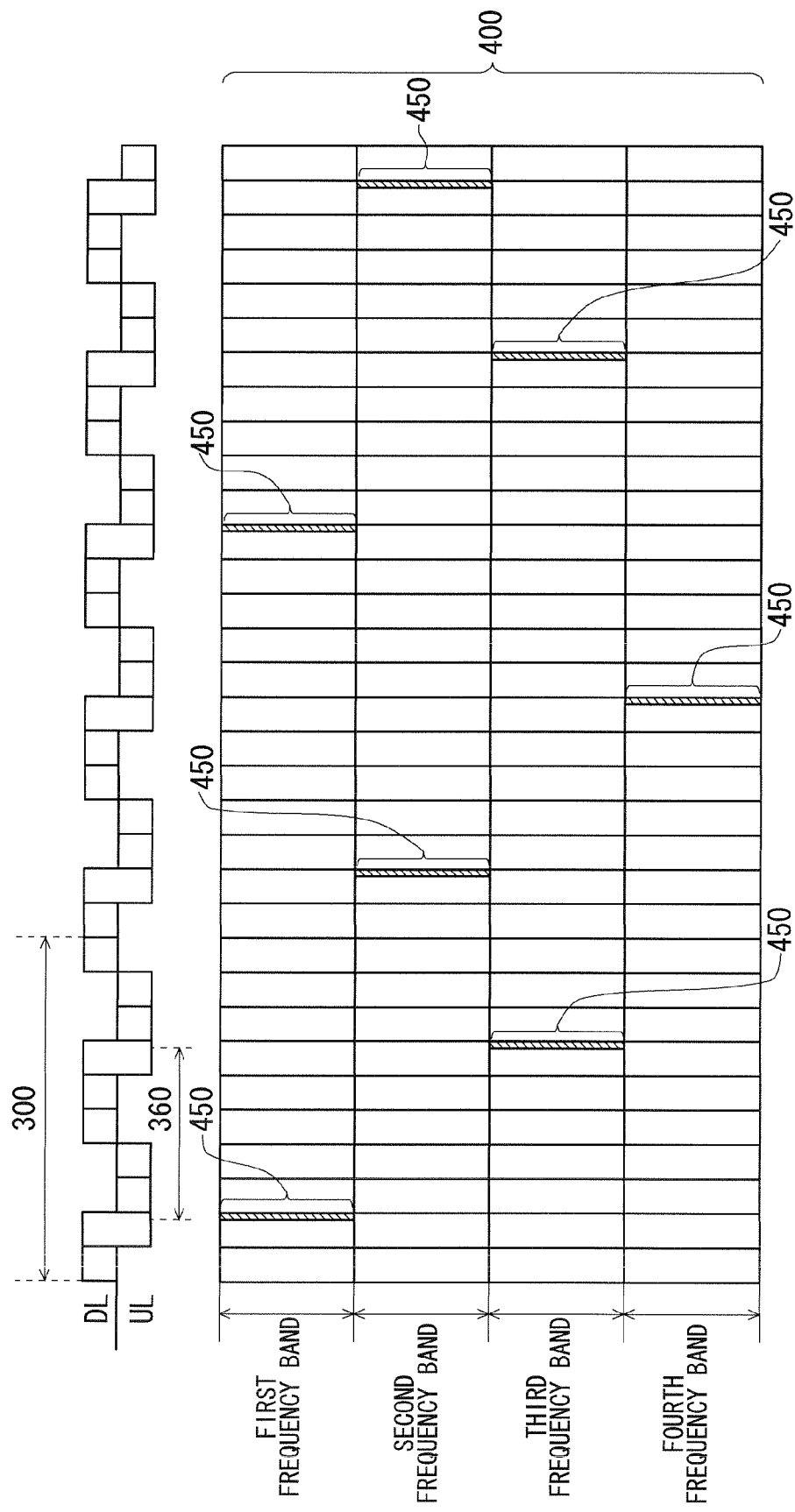
FIG. 6 is a diagram showing an example in which an SRS transmission band is frequency-hopped.

FIG. 6 is a diagram showing an example of the frequency hopping of the SRS transmission band 450 used by a communication terminal 2 within the entire range of the SRS transmittable band 400. In the example of FIG. 6, the length of the SRS transmission cycle 360 is set to 5 ms, and the SRS transmittable band 400 is divided into first to fourth frequency bands. The SRS transmission band 450 having a bandwidth which is a quarter of the bandwidth of the SRS transmittable band 400 is changed for each SRS transmission cycle 360 in the following order: the first frequency band, the third frequency band, the second frequency band and the fourth frequency band.

Figure 7:
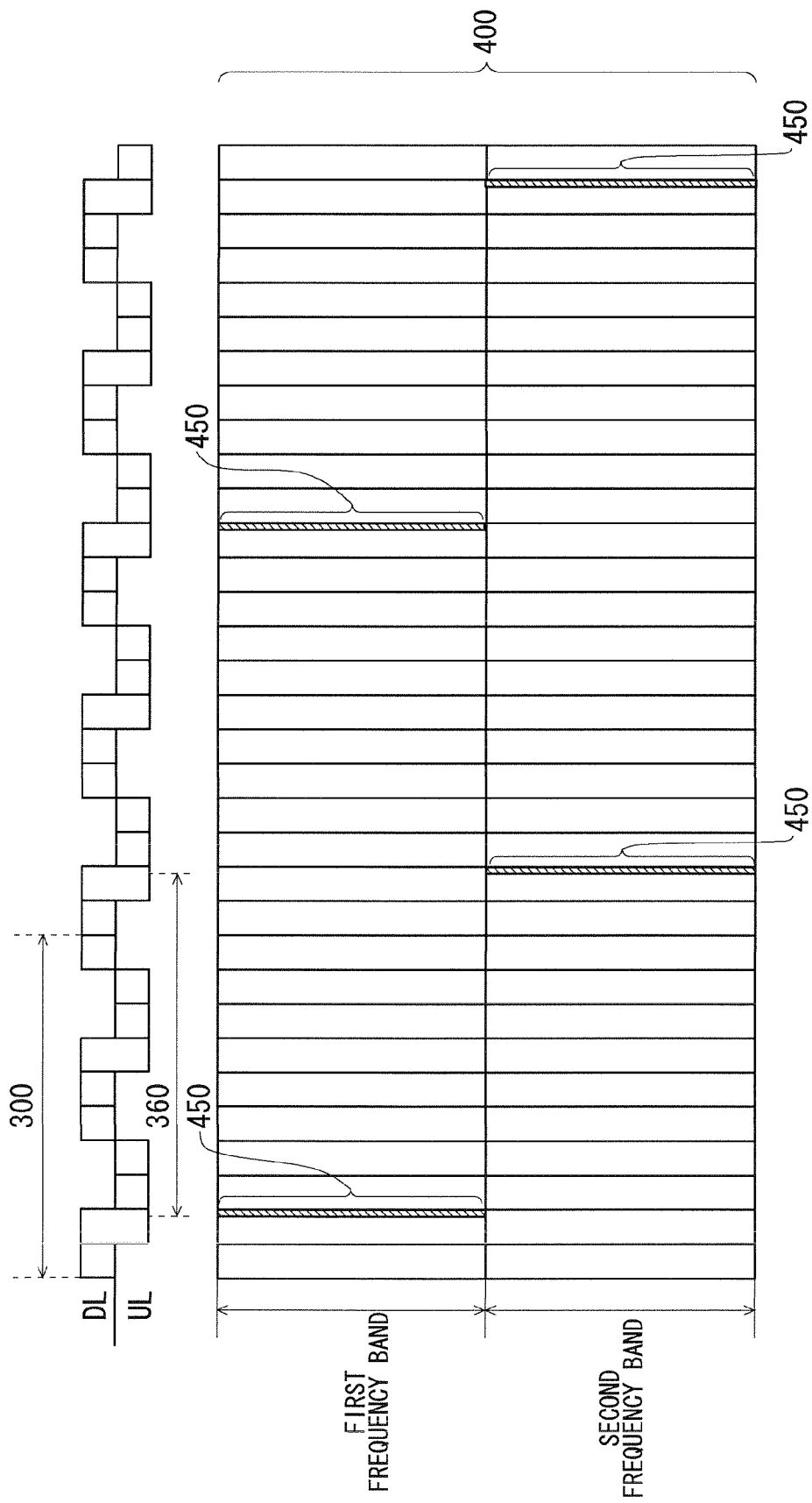
FIG. 7 is a diagram showing an example in which an SRS transmission band is frequency-hopped.

FIG. 7 is a diagram showing another example of the frequency hopping of the SRS transmission band 450 used by a communication terminal 2 within the entire range of the SRS transmittable band 400. In the example of FIG. 7, the length of the SRS transmission cycle 360 is set to 10 ms, and the SRS transmittable band 400 is divided into first and second frequency bands. The SRS transmission band 450 having a bandwidth which is one half of the bandwidth of the SRS transmittable band 400 is changed for each SRS transmission cycle 360 alternately between the first and second frequency bands.

The SRS transmission band 450 may be fixed to a constant frequency band without the frequency hopping. In other words, each of the communication terminals 2 is capable of cyclically transmitting the SRS having a constant transmission frequency band.

The transmission mode determining section 125 for determining the transmission mode of the SRS determines the SRS transmission bandwidth, the start position of the SRS transmission band 450, and the SRS transmission cycle 360 for each of the communication terminals 2 for communication with the base station 1. When the start position of the SRS transmission band 450 is changed for each SRS transmission cycle 360, the SRS transmission band 450 is frequency-hopped. The transmission mode determining section 125 determines the SRS transmission bandwidth and the start position of the SRS transmission band 450 for each communication terminal 2 to thereby determine the SRS transmission band 450 for each communication terminal 2.

The transmission signal generating section 120 generates a transmission signal including control data (referred to hereinafter as "SRS control data") for notifying a communication terminal 2 about the transmission mode of the SRS to be transmitted by the communication terminal 2 which is determined by the transmission mode determining section 125. This transmission signal is transmitted from the communication section 13 to the communication terminal 2 by using the downlink sub-frame 302*d*. Thus, the SRS control data is transmitted to each communication terminal 2. This allows each communication terminal 2 to know the transmission mode of the SRS to be transmitted therefrom. In other words, each communication terminal 2 is allowed to recognize the SRS transmission bandwidth, the start position of the SRS transmission band 450 and the SRS transmission cycle 360 for the SRS to be transmitted therefrom. Each communication terminal 2 cyclically transmits the SRS, based on the transmission mode determined by the base station 1.

It should be noted that the SRS control data includes transmission start data for providing an instruction to start the transmission of the SRS or transmission stop data for providing an instruction to stop the transmission of the SRS. Upon receipt of the SRS control data including the transmission start data, a communication terminal 2 which is not transmitting the SRS starts the cyclic transmission of the SRS, based on the transmission mode about which an instruction is provided by the SRS control data. Upon receipt of the SRS control data including the transmission stop data, a communication terminal 2 which is cyclically transmitting the SRS stops the transmission of the SRS. When changing the transmission mode of the SRS to be transmitted by a communication terminal 2, the SRS control data for providing an instruction about a changed transmission mode is notified to the communication terminal 2. Such SRS control data is referred to as an "RRCConnectionReconfiguration message" in LTE.

<Basic Operation of Communication System in Controlling Transmission of SRS>

Figure 8:
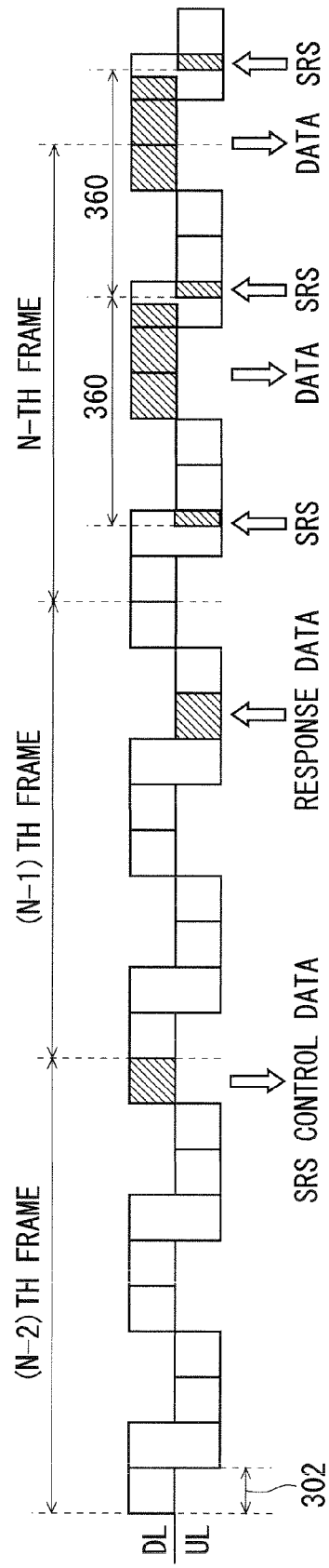
FIG. 8 is a diagram showing the operation of the communication system.

Next, description will be given on the basic operation of the communication system 100 after a communication terminal 2 receives the SRS control data and until the communication terminal 2 transmits the SRS, based on the transmission mode about which notification is provided to the communication terminal 2 by the use of the SRS control data. FIG. 8 is a diagram showing the basic operation. A communication terminal 2 about which description is given is referred to hereinafter as a "target communication terminal 2" in some cases.

As shown in FIG. 8, after the transmission signal including the SRS control data is transmitted from the base station 1 to a target communication terminal 2 in the downlink sub-frame 302*d* positioned in the trailing end of the (N−2)th TDD frame 300, the target communication terminal 2 transmits the transmission signal including response data for notifying the base station 1 that the SRS control data is normally received to the base station 1 in the eighth uplink sub-frame 302*u* (the seventh sub-frame 302) from the leading end of the next or (N−1)th TDD frame 300. Such response data is referred to as an "RRCConnectionReconfigurationComplete message."

After transmitting the response data, the target communication terminal 2 transmits the SRS in the transmission mode about which the instruction is provided by the received SRS control data in and after the next N-th TDD frame 300. In the example of FIG. 8, the length of the SRS transmission cycle 360 is set to 5 ms.

In the example of FIG. 8, the target communication terminal 2 transmits the response data in the (N−1)th TDD frame 300. However, the target communication terminal 2 transmits the response data in a TDD frame 300 subsequent to the (N−1)th TDD frame 300 in some cases.

In the case where the target communication terminal 2 which is transmitting the SRS receives the SRS control data for providing notification about a new transmission mode, the target communication terminal 2 transmits the SRS in the current transmission mode until transmitting the SRS in the new transmission mode about which notification is provided by the SRS control data (in the example of FIG. 8, until the second special sub-frame 302 of the (N−1)th TDD frame 300).

In this manner, after the base station 1 transmits the SRS control data to the target communication terminal 2 in a certain TDD frame 300, the target communication terminal 2 transmits the SRS, based on the SRS control data, in and after a TDD frame 300 which is at least the next but one from the certain TDD frame 300. Thus, in the case where the base station 1 instructs the target communication terminal 2 to start the transmission of the SRS or to change the transmission mode of the SRS, it takes a certain amount of time between the transmission of the SRS control data to the target communication terminal 2 and the reception of the SRS transmitted from the target communication terminal 2, based on the SRS control data.

After the use signal determining section 126 in the base station 1 determines the use of the SRS for the array transmission control for the target communication terminal 2, the communication section 13 effects the array transmission control, based on the SRS from the target communication terminal 2, when performing downlink communication with the target communication terminal 2. Specifically, after the SRS from the target communication terminal 2 is received by the communication section 13, the reception weight processing section 124 calculates the reception weight, based on the SRS. Then, the transmission weight processing section 123 calculates the transmission weights for application to the transmission signals to be transmitted to the target communication terminal 2, based on the reception weight calculated by the reception weight processing section 124. The transmission weight processing section 123 sets the calculated transmission weights to the plurality of transmission signals including data to the target communication terminal 2 which are generated by the transmission signal generating section 120, and inputs the plurality of transmission signals to which the transmission weights are set to the radio processing section 11. This directs the beam for the transmission directivity in the frequency band of the transmission signals to the target communication terminal 2 in the array antenna 110 toward the target communication terminal 2. As a result, the appropriate transmission of data to the target communication terminal 2 is achieved.

<About DRS>

In this communication system 100, the known signal referred to as a DRS is transmitted by using part of the uplink sub-frame 302*u* used for data transmission. The base station 1 may use not only the SRS but also the DRS for the array transmission control. The DRS is comprised of a plurality of complex symbols for modulating a plurality of subcarriers.

The DRS is transmitted in the fourth symbol period 304 from the leading end in each of the slots 303 of the uplink sub-frame 302u.

Figure 9:
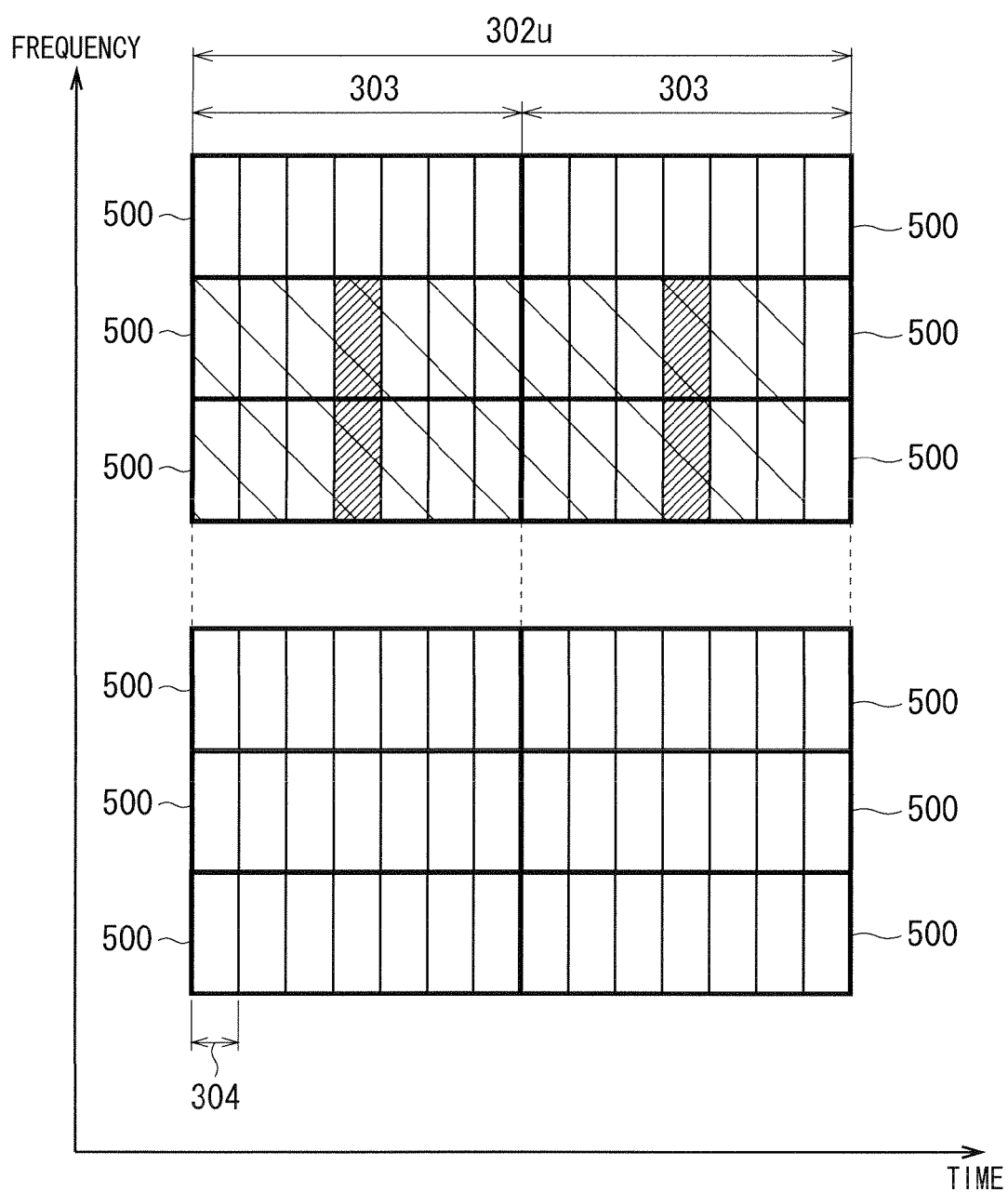
FIG. 9 is a diagram showing an example of the allocation of an uplink radio resource to a communication terminal.

The target communication terminal 2 transmits the DRS by using part of each resource block allocated for transmission of data from the uplink sub-frame 302u in the scheduling executing section 122 of the base station 1. FIG. 9 shows such transmission. In FIG. 9, a single uplink sub-frame 302u is shown, and resource blocks 500 allocated to the target communication terminal 2 (except the last symbol period 304 in which the SRS is transmittable in the uplink sub-frame 302u) are shaded diagonally from top left to bottom right. In the example of FIG. 9, four resource blocks 500 for data transmission are allocated to the target communication terminal 2. The target communication terminal 2 transmits the DRS by using a plurality of subcarriers of the fourth symbol period 304 from the leading end in each of the resource blocks 500 allocated thereto for data transmission. In FIG. 9, a portion including the fourth symbol period 304 from the leading end in each of the resource blocks 500 allocated to the target communication terminal 2 is both shaded diagonally from top left to bottom right and shaded diagonally from bottom left to top right.

After the use signal determining section 126 in the base station 1 determines the use of the DRS for the array transmission control for the target communication terminal 2, the communication section 13 effects the array transmission control, based on the DRS from the target communication terminal 2, when performing downlink communication with the target communication terminal 2.

<About Array Transmission Control>

When transmitting a signal to the target communication terminal 2 in the downlink sub-frame 302d, the base station 1 according to the present embodiment performs null steering and beamforming for the transmission directivity of the array antenna 110, based on the known signal (SRS or DRS) transmitted by the target communication terminal 2. The base station 1 according to the present embodiment uses a sequential update algorithm such as RLS (Recursive Least-Squares) algorithm, for example, to update the reception weights a plurality of times, based on the complex symbols included in the SRS or DRS. Then, the transmission weights are determined based on the reception weights after the completion of the update, whereby both the null steering and the beamforming are performed.

In the base station 1 according to the present embodiment, the transmission weight is determined, for example, for each frequency band of one resource block. The frequency band of one resource block is referred to hereinafter as an "allocation unit band." For example, when the frequency band of the transmission signal to be transmitted to the target communication terminal 2 in the downlink sub-frame 302d is comprised of four allocation unit bands, the transmission weight is determined for each of the four allocation unit bands. The transmission weight for application to the signal to be transmitted to the target communication terminal 2 by using a certain allocation unit band is determined based on some of the plurality of complex symbols constituting the known signal (SRS or DRS) received from the target communication terminal 2 which are transmitted using the certain allocation unit band. Twelve complex symbols are transmittable using one allocation unit band because one resource block includes 12 subcarriers.

In this manner, when the transmission signal is transmitted to the target communication terminal 2 in the downlink sub-frame 302d according to the present embodiment, the array transmission control is effected using part of the known signal received from the target communication terminal 2 which is transmitted in the same frequency band as the frequency band of the transmission signal. This improves the accuracy of the array transmission control, and thereby the beam can be appropriately directed toward the target communication terminal 2.

<Scheduling Operation of Radio Resource in Base Station>

Next, description will be given on a series of operations of the base station 1 performed until the base station 1 schedules the allocation of radio resources to the communication terminals 2 to perform communications with the communication terminals 2 based on the result of the scheduling.

Figure 10:
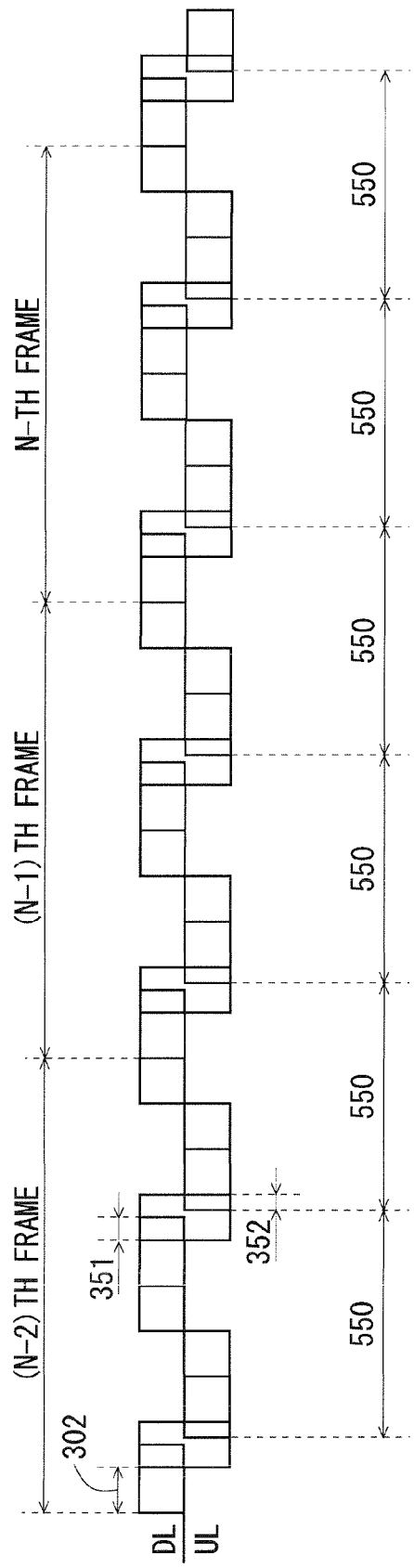
FIG. 10 is a diagram showing a scheduling target time period.

In the present embodiment, scheduling target time periods including uplink communication time periods and downlink communication time periods are determined, and the allocation of the uplink and downlink radio resources in each scheduling target time period are allocated to the communication terminals 2 is scheduled for each scheduling target time period. In the present embodiment, a time period from the leading end of the uplink pilot time slot 352 of a special sub-frame 302 to the leading end of the uplink pilot time slot 352 of the next special sub-frame 302, for example, is a single scheduling target time period 550, as shown in FIG. 10. In the case where the TDD frame 300 having the first configuration is used as in the present embodiment, the scheduling target time period 550 includes two uplink sub-frames 302u as a data uplink communication time period, and two downlink sub-frames 302d and the downlink pilot time slot 351 of one special sub-frame 302 as a data downlink communication time period.

A leading one of the two uplink sub-frames 302u included in the scheduling target time period 550 is referred to hereinafter as a first uplink sub-frame 302u, and a trailing one thereof is referred to as a second uplink sub-frame 302u. Part of the special sub-frame 302 which includes the downlink pilot time slot 351 in a time direction is not equivalent to the downlink sub-frame 302d included in the TDD frame 300. However, the downlink sub-frame 302d shall include this part unless otherwise specified. A leading one of the two downlink sub-frames 302d included in the scheduling target time period 550 is referred to hereinafter as a first downlink sub-frame 302d, and a trailing one thereof is referred to as a second downlink sub-frame 302d. Part of the special sub-frame 302 included in the scheduling target time period 550 which includes the downlink pilot time slot 351 in the time direction is referred to as a third downlink sub-frame 302d.

Figure 11:
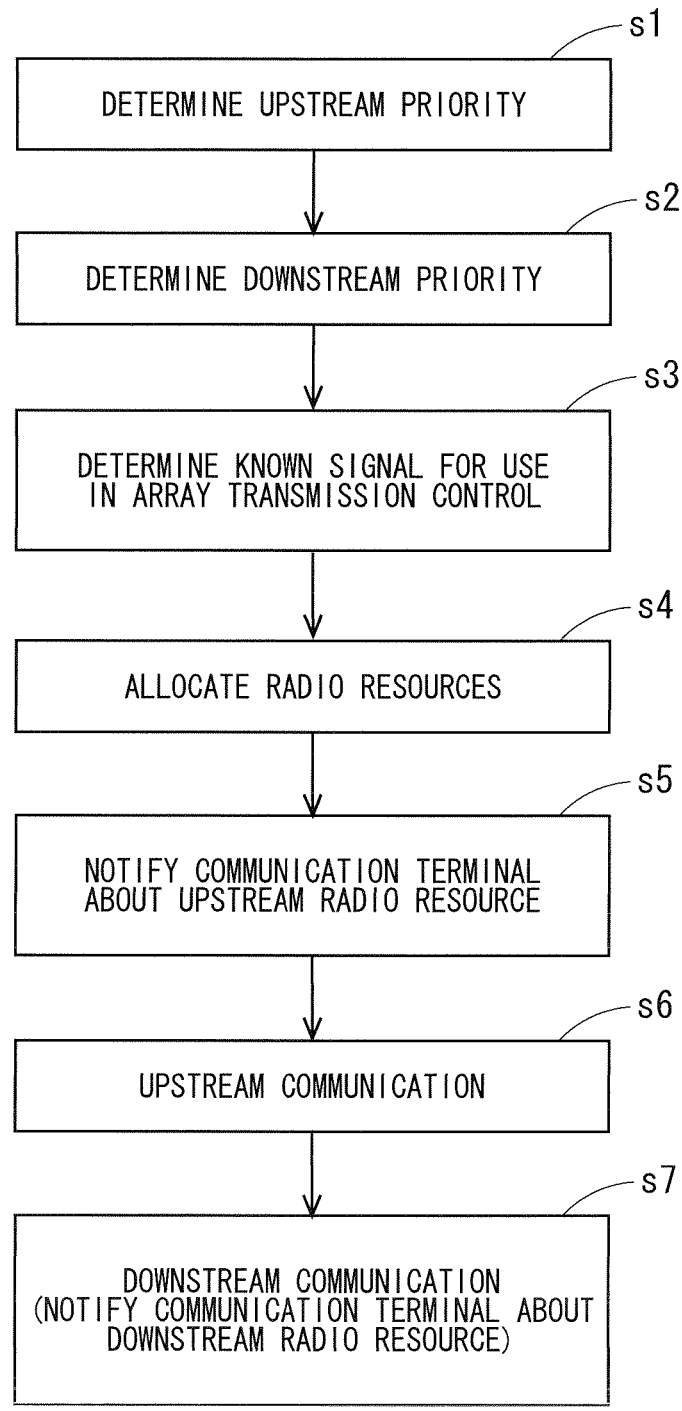
FIG. 11 is a flow diagram showing the operation of the base station.

FIG. 11 is a flow diagram showing a series of operations of the base station 1 performed until the base station 1 schedules the radio resources in a certain scheduling target time period 550 to perform communications with the communication terminals 2 in the certain scheduling target time period 550, based on the result of the scheduling. First, a general description on the series of operations will be given with reference to FIG. 11.

In the present embodiment, for example, the scheduling of the radio resources in the scheduling target time period 550, i.e. a series of processes in Steps s1 to s5 shown in FIG. 11, is executed in the TDD frame 300 immediately preceding the TDD frame 300 including the uplink pilot time slot 352 of the scheduling target time period 550. With reference to FIG. 10, for example, the scheduling of the radio resources in the scheduling target time period 550 including the uplink pilot time slot 352 of a leading one of the special sub-frames 302 of the N-th TDD frame 300 and the scheduling of the radio resources in the scheduling target time period 550 including the uplink pilot time slot 352 of a trailing one of the special sub-frames 302 of the N-th TDD frame 300 are executed in the (N−1)th TDD frame 300.

As shown in FIG. 11, the scheduling executing section 122 in the base station 1 determines an uplink priority, which is the priority of uplink communication, for each of the communication terminals 2 to be subjected to the uplink communication in Step s1. The communication terminals 2 to be subjected to the uplink communication refer to the communication terminals 2 having transmission-waiting data should to be transmitted to the base station 1.

Next, the scheduling executing section 122 determines a downlink priority, which is the priority of downlink communication, for each of the communication terminals 2 to be subjected to the downlink communication in Step s2. The downlink priority for a communication terminal 2 is set so as to increase with an increase in the uplink priority for the communication terminal 2. The communication terminals 2 to be subjected to the downlink communication refer to the communication terminals 2 such that the base station 1 has transmission-waiting data should to be transmitted thereto.

Next, in Step s3, the use signal determining section 126 determines the known signal for use in the array transmission control for a communication terminal 2 which is included among the communication terminals 2 to be subjected to the downlink communication and which has the downlink priority higher than a threshold value α as the DRS. When the communication terminal 2 to be subjected to the downlink communication which has the downlink priority higher than the threshold value α is not the communication terminal 2 to be subjected to the uplink communication or is the communication terminal 2 having no transmission-waiting data to be transmitted to the base station 1 in the scheduling target time period 550, the use signal determining section 126 determines the known signal for use in the array transmission control for the communication terminal 2 to be subjected to the downlink communication in the scheduling target time period 550 as the SRS. For downlink communication with the communication terminal 2 for which the known signal for use in the array transmission control is determined as the DRS, the base station 1 effects the array transmission control, based on the DRS transmitted from the communication terminal 2 in the uplink sub-frame 302u of the scheduling target time period 550.

On the other hand, the use signal determining section 126 determines the known signal for use in the array transmission control for a communication terminal 2 which is included among the communication terminals 2 to be subjected to the downlink communication and which has the downlink priority lower than the threshold value α as the SRS. For downlink communication with the communication terminal 2 for which the known signal for use in the array transmission control is determined as the SRS, the base station 1 effects the array transmission control, based on the SRS transmitted from the communication terminal 2 in the SRS transmission symbol period 370 included in the scheduling target time period 550, or based on the SRS transmitted from the communication terminal 2 as close to the scheduling target time period 550 as possible in timing when the aforementioned SRS is absent.

The known signal for use in the array transmission control for a communication terminal 2 which has the downlink priority equal to the threshold value α may be determined as the DRS or the SRS. In the present embodiment, the known signal for use in the array transmission control for a communication terminal 2 which has the downlink priority not less than the threshold value α shall be determined as the DRS.

Next, in Step s4, the scheduling executing section 122 determines a communication terminal 2 (referred to hereinafter as a "downlink-communication-determined terminal 2" in some cases) with which the downlink communication of data is to be performed in the scheduling target time period 550, based on the downlink priorities of the communication terminals 2 to be subjected to the downlink communication, and allocates a downlink radio resource to the downlink-communication-determined terminal 2 from the first to third downlink sub-frames 302d included in the scheduling target time period 550. Also, the scheduling executing section 122 determines a communication terminal 2 (referred to hereinafter as an "uplink-communication-determined terminal 2" in some cases) with which the uplink communication of data is to be performed in the scheduling target time period 550, based on the uplink priorities of the communication terminals 2 to be subjected to the uplink communication, and allocates an uplink radio resource to the uplink-communication-determined terminal 2 from the first and second uplink sub-frames 302u included in the scheduling target time period 550.

The scheduling executing section 122 according to the present embodiment allocates the necessary downlink radio resources to the communication terminals 2 in descending order of downlink priorities of the communication terminals 2, for example. The scheduling executing section 122 completes the process of allocating the downlink radio sources when there are no longer any downlink radio resources to be allocated to the communication terminals 2 in the first to third downlink sub-frames 302d. However, the communication terminal 2 which is not transmitting the SRS is present during the scheduling in the scheduling target time period 550 in the present embodiment, which will be described later. Thus, the array transmission control for this communication terminal 2 cannot be effected by using the SRS. Thus, the downlink radio resource shall not be allocated in the scheduling target time period 550 to the communication terminal 2 which is not transmitting the SRS and for which the known signal for use in the array transmission control thereof is determined as the SRS. That is, the scheduling executing section 122 determines the downlink-communication-determined terminal 2 from among the communication terminals 2 to be subjected to the downlink communication except the communication terminal 2 which is not transmitting the SRS and for which the known signal for use in the array transmission control is determined as the SRS.

The scheduling executing section 122 according to the present embodiment allocates the necessary uplink radio resources to the communication terminals 2 in descending order of uplink priorities of the communication terminals 2, for example. The scheduling executing section 122 completes the process of allocating the uplink radio sources when there are no longer any uplink radio resources to be allocated to the communication terminals 2 in the first and second uplink sub-frames 302u. As will be described later, the scheduling executing section 122 determines the execution of the uplink communication in the scheduling target time period 550 with the communication terminal 2 for which the use signal determining section 126 determines the use of the DRS for the array transmission control and allocates an uplink radio resource to this communication terminal 2 without consideration for the uplink priority thereof (with a disregard of the uplink priority).

Next, in Step s5, the base station 1 notifies the uplink-communication-determined terminal 2 about the uplink radio resource allocated to the uplink-communication-determined terminal 2. Specifically, the transmission signal generating section 120 generates a transmission signal including the control data for notifying the uplink-communication-determined terminal 2 about the uplink radio resource allocated to the uplink-communication-determined terminal 2 by the scheduling executing section 122, and the communication section 13 transmits the transmission signal by radio.

The notification about the uplink radio resource allocated to a communication terminal 2 from the first uplink sub-frame 302*u* of the current scheduling target time period 550 is provided to the communication terminal 2, for example, in the third downlink sub-frame 302*d* of the second scheduling target time period 550 previous to the current scheduling target time period 550. The notification about the uplink radio resource allocated to a communication terminal 2 from the second uplink sub-frame 302*u* of the current scheduling target time period 550 is provided to the communication terminal 2, for example, in the first downlink sub-frame 302*d* of the scheduling target time period 550 immediately preceding the current scheduling target time period 550.

After Step s5 is executed, the communication section 13 in the base station 1 performs the uplink communication with the uplink-communication-determined terminal 2 to which the uplink radio resource is allocated by the scheduling executing section 122 in the first and second uplink sub-frames 302*u* of the scheduling target time period 550 by using the uplink radio resource in Step s6. That is, the communication section 13 in the base station 1 receives a signal which the uplink-communication-determined terminal 2 transmits by using the uplink radio resource allocated thereto in the first and second uplink sub-frames 302*u* of the scheduling target time period 550. The uplink-communication-determined terminal 2 transmits the DRS using part of the uplink radio resource allocated thereto.

Thereafter, the communication section 13 transmits a signal to the downlink-communication-determined terminal 2 in the first to third downlink sub-frames 302*d* of the scheduling target time period 550 by using the downlink radio resource allocated to the downlink-communication-determined terminal 2 in Step s7. At this time, the communication section 13 effects the array transmission control, based on the known signal (SRS or DRS) determined to be used by the use signal determining section 126 for the downlink-communication-determined terminal 2.

The notification about the downlink radio resource allocated to a communication terminal 2 from each of the downlink sub-frames 302*d* of the scheduling target time period 550 is provided to the communication terminal 2 by using part of the downlink radio resource. Specifically, the notification provided to the communication terminal 2 about the downlink radio resource allocated to the communication terminal 2 from a certain downlink sub-frame 302*d* is transmitted in any one of the symbol periods 304 between the first symbol period 304 and the third symbol period 304 included in the downlink radio source in the downlink sub-frame 302*d*. The transmission signal generating section 120 generates a transmission signal including the control data for notifying the downlink-communication-determined terminal 2 about the downlink radio resource allocated to the downlink-communication-determined terminal 2 by the scheduling executing section 122, and the communication section 13 transmits the transmission signal by radio.

<Method of Determining Uplink Priority and Downlink Priority>

Next, the method of determining the uplink priority and the downlink priority in Steps s1 and s2 will be described in detail. In the present embodiment, the uplink priority is determined without consideration of downlink communication situations. On the other hand, the downlink priority is determined in consideration of the uplink priority.

The uplink priority is determined, based on proportional fairness (PF), for example. The uplink priority UM for the target communication terminal 2 in the scheduling target time period 550 is expressed by Equation (1) below.

$$UM = Ru/Tu \qquad (1)$$

where Ru is an available transfer rate which represents the expected value of the amount of data transmittable by the target communication terminal 2 in the scheduling target time period 550 and which is a value proportional to a modulation system used by the target communication terminal 2; and Tu is the average transmission throughput of the target communication terminal 2 which represents the average value of the amounts of data that the target communication terminal 2 has heretofore transmitted. As indicated in Equation (1), when the amounts of data that the target communication terminal 2 has heretofore transmitted are small, the uplink priority for the target communication terminal 2 is high. Also, when the uplink communication quality for the target communication terminal 2 is good so that the target communication terminal 2 is allowed to use a modulation system having a high modulation level for the transmission of data to the base station 1, the uplink priority for the target communication terminal 2 is high.

For the downlink priority, on the other hand, a temporary downlink priority (referred to hereinafter as a "tentative downlink priority") is determined in a manner similar to that for the uplink priority, based on proportional fairness. The tentative downlink priority pDM for the target communication terminal 2 in the scheduling target time period 550 is expressed by Equation (2) below.

$$pDM = Rd/Td \qquad (2)$$

where Rd is an available transfer rate which represents the expected value of the amount of data transmittable by the base station 1 to the target communication terminal 2 in the scheduling target time period 550 and which is a value proportional to a modulation system used by the base station 1 transmitting to the target communication terminal 2; and Td is the average transmission throughput of the base station 1 to the target communication terminal 2 which represents the average value of the amounts of data that the base station 1 has heretofore transmitted to the target communication terminal 2. As will be understood from Equation (2), the tentative downlink priority pDM is determined without consideration of uplink communication situations.

Next, the downlink priority DM for use in the scheduling of the downlink radio resources is determined using the tentative downlink priority pDM and the uplink priority UM. The downlink priority DM for the communication terminal 2 is determined so as to increase with an increase in the uplink priority UM for the communication terminal 2. The downlink priority DM for the target communication terminal 2 in the scheduling target time period 550 is expressed by Equation (3) below using the tentative downlink priority pDM and the uplink priority UM for the target communication terminal 2.

$$DM = F(pDM, UM) \qquad (3)$$

where F(A,B) represents a function the value of which increases when both A and B increase. In other words, F(A,B) represents a function the value of which increases when one of A and B is not changed but the other increases. Thus, the downlink priority DM for the target communication terminal 2 increases with an increase in the uplink priority UM for the target communication terminal 2. For example, Equation (4) below may be used for F(pDM,UM).

$$DM = F(pDM, UM) = pDM^{Cd} \times UM^{Cu} \quad (4)$$

where Cd and Cu are adjustment constants and have values greater than zero. It should be noted that, when there is no transmission-waiting data to be transmitted by the target communication terminal 2 in the scheduling target time period 550, the downlink priority DM is determined as an exception assuming that Cu=0.

For example, Equation (5) below may be used for F(pDM, UM) in place of Equation (4).

$$DM = F(pDM, UM) = Cd \times pUM + Cu \times UM \quad (5)$$

The uplink priority UM and the downlink priority DM for each of the communication terminals 2 to be subjected to communications are determined in this manner in the scheduling executing section 122.

<Transmission Instruction Control of SRS>

The base station 1 in the present embodiment makes a communication terminal 2 to transmit the SRS only when it is judged that there is a high likelihood that the SRS is used for the array transmission control for the communication terminal 2. The transmission instruction control of the SRS in the base station 1 will be described below.

In the present embodiment, the transmission mode determining section 125 judges whether to cause a communication terminal 2 to transmit the SRS by using the downlink priority DM determined in the scheduling or not, when the scheduling executing section 122 schedules the radio resources in the scheduling target time period 550. Specifically, the transmission mode determining section 125 determines to cause a communication terminal 2 to transmit the SRS when the downlink priority DM for the communication terminal 2 to be subjected to the downlink communication which is not transmitting the SRS is lower than the threshold value α. Then, the communication section 13 transmits the SRS control data including the transmission start data to the communication terminal 2 to instruct the communication terminal 2 to transmit the SRS.

As mentioned above, it is judged that the SRS is used for the array transmission control for the communication terminal 2 with the downlink priority DM lower than the threshold value α. The downlink radio resource is not allocated in the scheduling target time period 550 to a communication terminal 2 for which the SRS is determined to be used for the array transmission control but which is not transmitting the SRS. When the downlink radio resource is allocated to such a communication terminal 2 immediately after the scheduling target time period 550, there is a high likelihood that the downlink priority DM for the communication terminal 2 is still lower than the threshold value α. Thus, it is judged that there is a high likelihood that the SRS is used for the array transmission control after the scheduling target time period 550 for the communication terminal 2 which is not transmitting the SRS and which has the downlink priority DM lower than the threshold value α. Thus, the communication terminal 2 is instructed to transmit the SRS.

For instructing the communication terminal 2 which is not transmitting the SRS and which has the downlink priority DM lower than the threshold value α to transmit the SRS, the transmission mode determining section 125 determines the SRS transmission band 450, based on the amount of transmission-waiting data in the base station 1 for the current communication terminal 2. The transmission mode determining section 125 sets the length of the SRS transmission cycle 360 for the current communication terminal 2 to 5 ms so that the SRS is necessarily transmitted in the uplink pilot time slot 352 of each scheduling target time period 550. It should be noted that the SRS transmission band 450 for the current communication terminal 2 may or may not be frequency-hopped.

Figure 12:
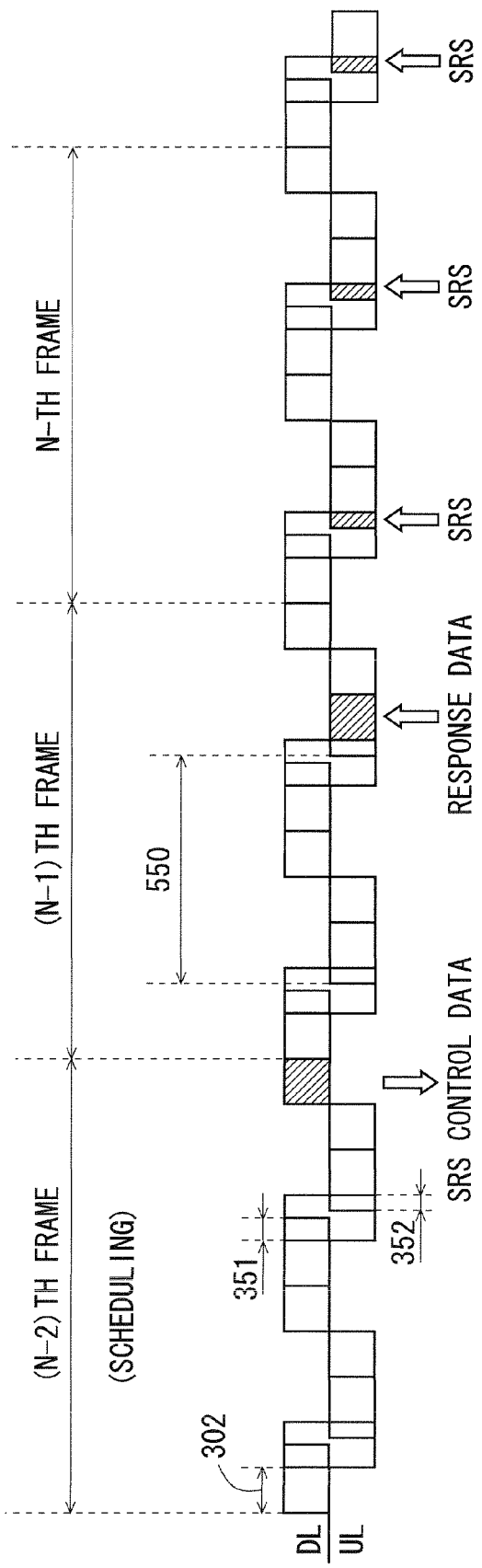
FIG. 12 is a diagram showing the operation of the communication system.

FIG. 12 is a diagram showing an example of instructing a communication terminal 2 which is not transmitting the SRS and which has the downlink priority DM lower than the threshold value α to transmit the SRS. In the example of FIG. 12, the scheduling of the radio resources in the scheduling target time period 550 including the uplink pilot time slot 352 of a preceding one of the special sub-frames 302 of the (N−1)th TDD frame 300 is performed in the (N−2)th TDD frame 300. Then, the instruction to transmit the SRS is provided to the target communication terminal 2 which has the downlink priority DM determined in the scheduling and lower than the threshold value α and which is not transmitting the SRS.

As shown in FIG. 12, the SRS control data including the transmission start data is transmitted to the target communication terminal 2 in the last downlink sub-frame 302d of the (N−2)th TDD frame 300 in which the scheduling is performed. Then, the response data is transmitted from the target communication terminal 2 in the uplink sub-frame 302u immediately after the scheduling target time period 550. Thereafter, the SRS is transmitted from the target communication terminal 2 in a preceding one of the special sub-frames 302 of the N-th TDD frame 300. In some cases, the response data is transmitted from the target communication terminal 2 in an uplink sub-frame 302u subsequent to the uplink sub-frame 302u immediately after the scheduling target time period 550, rather than in the uplink sub-frame 302u immediately after the scheduling target time period 550.

On the other hand, the transmission mode determining section 125 determines to cause a communication terminal 2 to stop transmitting the SRS when the downlink priority DM for the communication terminal 2 to be subjected to the downlink communication which is transmitting the SRS is not less than the threshold value α. Then, the communication section 13 transmits the SRS control data including the transmission stop data to the communication terminal 2 to instruct the communication terminal 2 to stop transmitting the SRS.

For a communication terminal 2 with the downlink priority DM not less than the threshold value α in the scheduling target time period 550, there is a high likelihood that the downlink priority DM is not less than the threshold value α for some period of time after the scheduling target time period 550, and there is a low likelihood that the SRS is used for the array transmission control for the communication terminal 2. Thus, the communication terminal 2 which is transmitting the SRS and which has the downlink priority DM not less than the threshold value α is instructed to stop transmitting the SRS.

Figure 13:
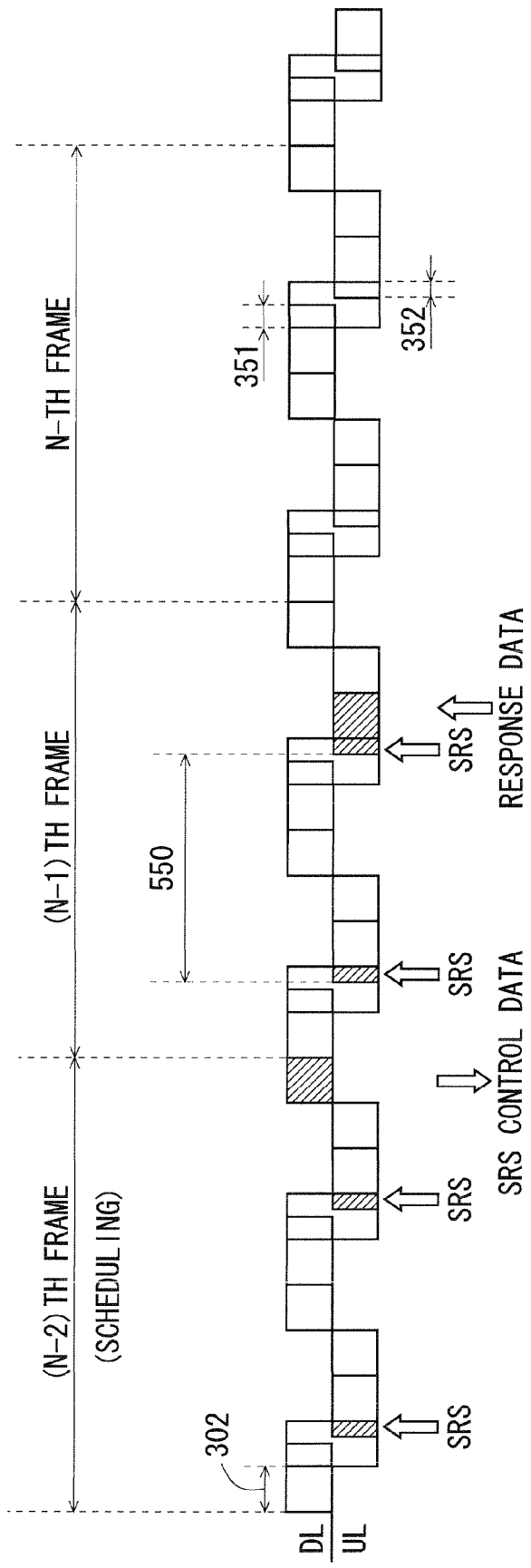
FIG. 13 is a diagram showing the operation of the communication system.

FIG. 13 is a diagram showing an example of instructing a communication terminal 2 which is transmitting the SRS and which has the downlink priority DM not less than the threshold value α to stop transmitting the SRS. In the example of FIG. 13, the scheduling of the radio resources in the scheduling target time period 550 including the uplink pilot time slot 352 of a preceding one of the special sub-frames 302 of the (N−1)th TDD frame 300 is performed in the (N−2)th TDD frame 300, as in the example of FIG. 12. Then, the instruction to stop transmitting the SRS is provided to the target communication terminal 2 which has the downlink priority DM determined in the scheduling and not less than the threshold value α and which is transmitting the SRS.

As shown in FIG. 13, the SRS control data including the transmission stop data is transmitted to the target communication terminal 2 in the last downlink sub-frame 302d of the (N−2)th TDD frame 300 in which the scheduling is performed. Then, the response data is transmitted from the target communication terminal 2 in the uplink sub-frame 302u immediately after the scheduling target time period 550. Thereafter, the target communication terminal 2 no longer transmits the SRS.

When the downlink priority DM for a communication terminal 2 which is transmitting the SRS is lower than the threshold value α, the current transmission mode of the SRS for the communication terminal 2 may be maintained or a new transmission mode may be determined. When determining a new transmission mode of the SRS for the communication terminal 2, the transmission mode determining section 125 determines a new SRS transmission band, based on the amount of transmission-waiting data in the base station 1 for the communication terminal 2 at the time. The communication section 13 transmits to the communication terminal 2 the SRS control data for notifying the communication terminal 2 about the new SRS transmission band determined by the transmission mode determining section 125.

As mentioned above, only when it is judged that there is a high likelihood that the SRS is used for the array transmission control for a communication terminal 2, the communication terminal 2 is caused to transmit the SRS. This achieves the effective use of the uplink radio resources usable for the transmission of the SRS which are determined separately from the uplink radio resources usable for the transmission of data.

<Method of Allocating Uplink and Downlink Radio Resources>

Next, a method of allocating the uplink and downlink radio resources in Step s4 will be described in detail. In the present embodiment, a communication terminal 2 which is included among the downlink-communication-determined terminals 2 and for which the DRS is used for the array transmission control shall be the uplink-communication-determined terminal 2 independently of the uplink priority UM therefor, and the downlink radio source and the uplink radio resource are allocated to the communication terminal 2 so that the frequency band of the downlink radio resource is included in the frequency band of the uplink radio resource.

On the other hand, the downlink radio resource is allocated to a communication terminal 2 which is included among the downlink-communication-determined terminals 2 and for which the SRS is used for the array transmission control so that the frequency band of the downlink radio resource is included in the transmission frequency band of the SRS transmitted from the communication terminal 2.

The downlink radio source and the uplink radio resource are allocated to an uplink-communication-determined terminal 2 which serves as the downlink-communication-determined terminal 2 and for which the DRS is used for the array transmission control so that the frequency band of the downlink radio resource is included in the frequency band of the uplink radio resource, as mentioned above. The uplink radio resource is allocated to the remaining communication terminals 2 included among the uplink-communication-determined terminals 2 without consideration of the downlink communication situations of the remaining communication terminals 2, independently of whether or not the remaining communication terminals 2 serve as the downlink-communication-determined terminals 2.

Figure 14:
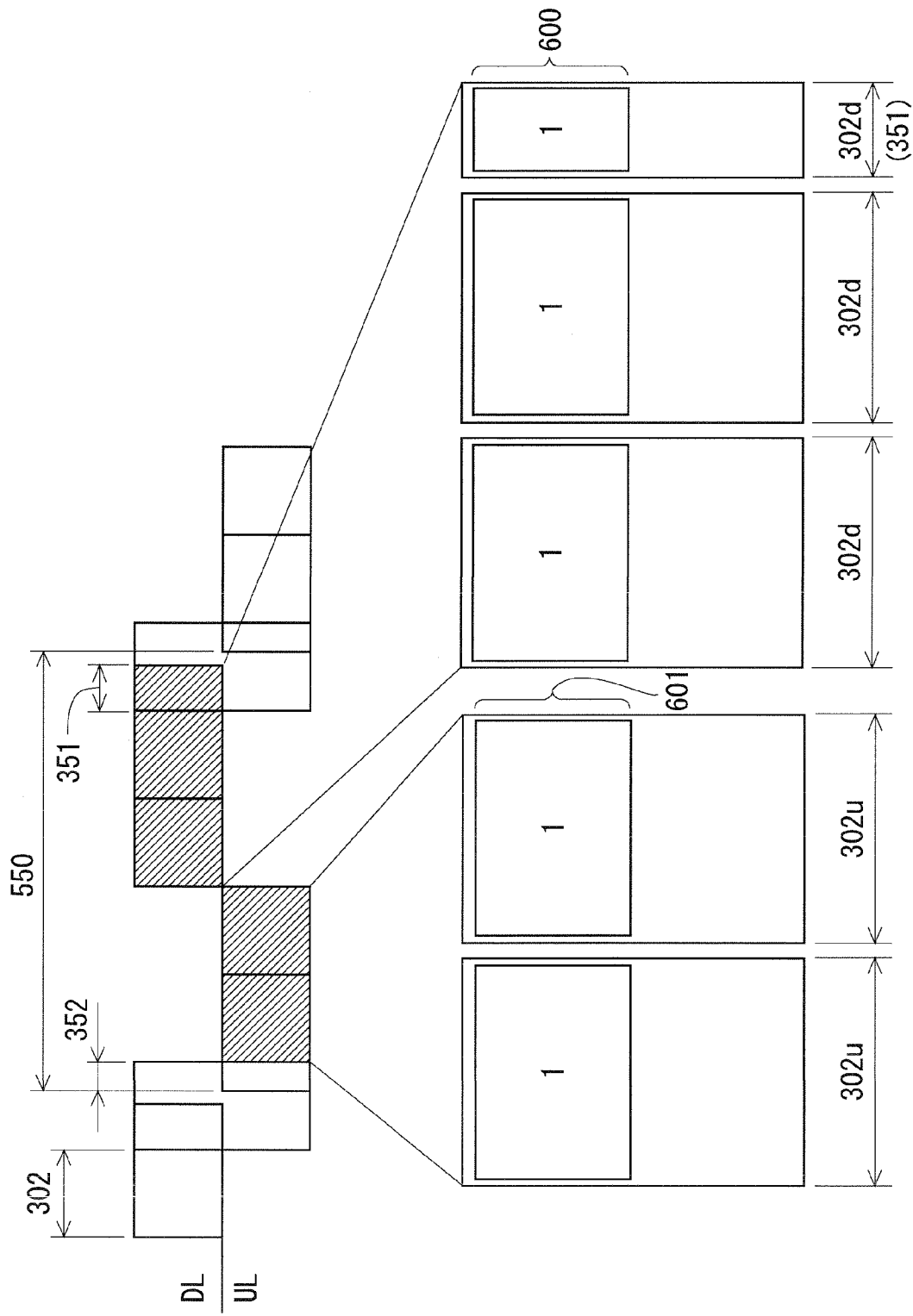
FIG. 14 is a diagram showing an example of the allocation of an uplink radio resource and a downlink radio resource to a communication terminal.

FIG. 14 is a diagram showing an example of allocating the downlink and uplink radio resources in a certain scheduling target time period 550 to the target communication terminal 2 having a terminal number 1 which serves as the downlink-communication-determined terminal 2 and for which the DRS is used for the array transmission control.

In the example shown in FIG. 14, the downlink radio resource and the uplink radio resource are allocated to the target communication terminal 2 so that a frequency band 600 of the downlink radio resource coincides with a frequency band 601 of the uplink radio resource. As mentioned above, the frequency band of the DRS transmitted from the target communication terminal 2 by using part of the uplink radio resource allocated to the target communication terminal 2 coincides with the frequency band of the uplink radio resource. Thus, in the example of FIG. 14, the downlink radio resource and the uplink radio resource are allocated to the target communication terminal 2 so that the frequency band 600 of the downlink radio resource coincides with the frequency band of the DRS transmitted using part of the uplink radio resource.

The downlink radio resource and the uplink radio resource may be allocated to the target communication terminal 2 so that the frequency band of the downlink radio resource does not completely coincide with but is included in the frequency band of the uplink radio resource. In other words, the downlink radio resource and the uplink radio resource may be allocated to the target communication terminal 2 so that the frequency band of the downlink radio resource does not completely coincide with but is included in the frequency band of the DRS transmitted using part of the uplink radio resource.

In this manner, the downlink radio resource and the uplink radio resource are allocated to the target communication terminal 2 so that the frequency band of the downlink radio resource is included in the frequency band of the uplink radio resource. This allows the base station 1 to effect the array transmission control, based on the DRS having the same frequency band as the transmission signal, when transmitting the transmission signal to the target communication terminal 2 by using the downlink radio resource allocated to the target communication terminal 2. This improves the accuracy of the array transmission control to allow the beam to be appropriately directed toward the target communication terminals 2.

In the array transmission control effected during the transmission of a transmission signal to the target communication terminal 2 by using the downlink radio resource allocated to the target communication terminal 2 from each of the first to third downlink sub-frames 302d included in the scheduling target time period 550, either the DRS transmitted in part of the first uplink sub-frame 302u included in the scheduling target time period 550 or the DRS transmitted in part of the second uplink sub-frame 302u included in the scheduling target time period 550 may be used.

FIG. 15 is a diagram showing an example of allocating the downlink radio resource in a certain scheduling target time period 550 to the target communication terminal 2 having the terminal number 1 which serves as the downlink-communication-determined terminal 2 and for which the SRS is used for the array transmission control.

In the example shown in FIG. 15, the target communication terminal 2 transmits the SRS in a preceding one of the two SRS transmission symbol periods 370 included in the uplink pilot time slot 352 of a preceding one of the special sub-frames 302 of the scheduling target time period 550. The downlink radio resource is allocated to the target communication terminal 2 so that a frequency band 610 of the downlink radio resource coincides with the frequency band (SRS transmission band 450) of the SRS transmitted by the target communication terminal 2.

The downlink radio resource may be allocated to the target communication terminal 2 so that the frequency band of the downlink radio resource does not completely coincide with but is included in the frequency band of the SRS from the target communication terminal 2.

When the SRS transmission cycle 360 for the target communication terminal 2 is set to 10 ms or more and the SRS is not transmitted from the target communication terminal 2 in the scheduling target time period 550 unlike the example of FIG. 15, the downlink radio resource is allocated to the target communication terminal 2 so that the frequency band of the downlink radio resource is included in the frequency band of the SRS transmitted from the target communication terminal 2 at the timing as close as possible to the scheduling target time period 550.

In this manner, the downlink radio resource is allocated to the target communication terminal 2 so that the frequency band of the downlink radio resource is included in the frequency band of the SRS from the target communication terminal 2. This allows the base station 1 to effect the array transmission control, based on the SRS having the same frequency band as the transmission signal, when transmitting the transmission signal to the target communication terminal 2 by using the downlink radio resource allocated to the target communication terminal 2. This improves the accuracy of the array transmission control, and thereby the beam can be appropriately directed toward the target communication terminals 2.

When the time at which the signal is transmitted to the target communication terminal 2 and the time at which the SRS for use in the array transmission control therefor at that time is received are remote from each other in the communication section 13, there is a likelihood that a change occurs in situations of the propagation path between the base station 1 and the target communication terminal 2 during the time interval between the reception of the SRS from the target communication terminal 2 and the transmission of the signal to the target communication terminal 2 to result in the decrease in the accuracy of the array transmission control. Thus, for the transmission of the signal to the target communication terminal 2 as in the present embodiment, the accuracy of the array transmission control is improved by effecting the array transmission control, based on the SRS received as close to the transmission of the signal as possible in timing.

In the present embodiment, as described hereinabove, when the downlink priority DM for the target communication terminal 2 determined so as to increase with an increase in the uplink priority UM for the target communication terminal 2 is higher than the threshold value α, it is determined to use the DRS for the array transmission control during the downlink communication with the target communication terminal 2. Also, when the downlink priority DM is lower than the threshold value α, it is determined to use the SRS for the array transmission control during the downlink communication with the target communication terminal 2. This achieves the proper use of the DRS and the SRS which are usable in the array transmission control with efficiency. The effects thereof will be described hereinafter in detail.

In the case where the DRS is used for the array transmission control for the target communication terminal 2, the downlink radio resource and the uplink radio resource are allocated to the target communication terminal 2 so that the frequency band of the downlink radio resource is included in the frequency band of the uplink radio resource, as mentioned above. Thus, the flexibility of the allocation of the downlink radio resource and the uplink radio resource to the target communication terminal 2 is decreased. For example, to effect the array transmission control for the target communication terminal 2 with a high downlink priority and a low uplink priority by using the DRS, there are some cases where the uplink radio resource is allocated to the target communication terminal 2 with the low uplink priority, in place of allocating the uplink radio resource to another target communication terminal 2 with a high uplink priority.

On the other hand, in the case where the SRS is used for the array transmission control for the target communication terminal 2, the downlink radio resource may be allocated to the target communication terminal 2 independently of the allocation of the uplink radio resource to the target communication terminal 2.

However, a certain amount of time is required between the instant at which the target communication terminal 2 is instructed to transmit the SRS by using the SRS control data and the instant at which the target communication terminal 2 transmits the SRS, as shown in FIGS. 8 and 12 described above. Accordingly, a certain amount of time is required to effect the array transmission control based on the SRS for the target communication terminal 2 which is not transmitting the SRS. Unlike the instance where the DRS is used for the array transmission control, there are cases where the downlink communication with the target communication terminal 2 cannot be performed immediately even when the downlink communication is attempted while the array transmission control for the target communication terminal 2 is effected.

For the scheduling of the radio resources for the target communication terminal 2 in such a manner that all of the communication terminals 2 connected to the base station 1 always transmit the SRS unlike the present embodiment, the aforementioned problem does not arise but the downlink communication with the target communication terminal 2 can be performed immediately when the target communication terminal 2 is caused to always transmit the SRS. In such a case, however, it is necessary that the downlink radio resource is allocated to the target communication terminal 2 in accordance with the frequency band of the SRS transmitted by the target communication terminal 2, which in turn results in the decrease in the flexibility of the allocation of the downlink radio resources. Although the SRS transmission band 450 may be changed using the SRS control data, a certain amount of time is required between the instant at which notification about the change of the SRS transmission band 450 is provided to the target communication terminal 2 and the instant at which the SRS is transmitted from the target communication terminal 2 by using the new SRS transmission band 450. Accordingly, the downlink communication with the target communication terminal 2 cannot be performed immediately in the case where the SRS transmission band 450 is changed for the purpose of improving the flexibility of the allocation of the downlink radio resources.

Also, the downlink sub-frames 302d are used for the transmission of the SRS control data from the base station 1, and the uplink sub-frames 302u are used for the transmission of the response data from the communication terminals 2. This reduces the downlink and uplink radio resources usable for the transmission of user data.

In the case where the SRS transmission cycle 360 for the target communication terminal 2 is long, there is a likelihood that the array transmission control is effected based on the SRS transmitted from the target communication terminal 2 at a time significantly remote from the time at which the downlink communication is performed with the target communication terminal 2. This results in a likelihood that the accuracy of the array transmission control is decreased.

In this manner, the use of the DRS and the use of the SRS for the array transmission control provide advantages and disadvantages.

Thus, in the present embodiment, the DRS and the SRS are selectively used by the use of the downlink priority DM for the target communication terminal 2 which is determined so as to increase with an increase in the uplink priority UM for the target communication terminal 2. This achieves the efficient selective use of the DRS and the SRS.

In the present embodiment, when it is determined that the target communication terminal 2 having the downlink priority DM higher than the threshold value α and determined so that the DRS is used for the array transmission control is to be subjected to the downlink communication in the scheduling target time period 550, the target communication terminal 2 is determined to be subjected to the uplink communication in the scheduling target time period 550 independently of the uplink priority UM for the target communication terminal 2. This allows the communication section 13 to effect the array transmission control, based on the DRS transmitted from the target communication terminal 2 in the scheduling target time period 550 when performing the downlink communication with the target communication terminal 2 in the scheduling target time period 550. This allows the base station 1 to effect the array transmission control, based on the DRS transmitted from the target communication terminal 2 at a timing closer to the timing at which the downlink communication is performed with the target communication terminal 2. As a result, this improves the accuracy of the array transmission control to allow the beam to be appropriately directed toward the target communication terminal 2.

Further, the downlink priority DM for the target communication terminal 2 is determined so as to increase with an increase in the uplink priority UM for the target communication terminal 2. Thus, there is a high likelihood that the target communication terminal 2 having the downlink priority DM higher than the threshold value α has a high uplink priority UM. Therefore, even when the target communication terminal 2 is determined to be subjected to the uplink communication in the scheduling target time period 550 without consideration of the uplink priority UM for the target communication terminal 2, the target communication terminal 2 is determined to be subjected to the uplink communication in consideration of the uplink priority UM for the target communication terminal 2 to some extent as a consequence.

As described hereinabove, the base station 1 according to the present embodiment is capable of improving the accuracy of the array transmission control and achieving the uplink communication in consideration of the uplink priority UM for each communication terminal 2 to some extent.

On the other hand, when it is determined that the target communication terminal 2 having the downlink priority DM lower than the threshold value α and determined so that the SRS is used for the array transmission control is to be subjected to the downlink communication in the scheduling target time period 550, the communication section 13 effects the array transmission control, based on the SRS transmitted from the target communication terminal 2, when performing the downlink communication with the target communication terminal 2. The downlink priority DM for the target communication terminal 2 is determined so as to increase with an increase in the uplink priority UM for the target communication terminal 2. Thus, there is a high likelihood that the target communication terminal 2 has a low uplink priority UM when the target communication terminal 2 has a low downlink priority DM. Therefore, when the downlink communication is performed with the communication terminal 2 having a low uplink priority UM in the scheduling target time period 550, the array transmission control is effected based on the SRS from the communication terminal 2 without forcefully allocating the uplink radio resource to the communication terminal 2, i.e. while ensuring the flexibility of the allocation of the uplink radio resource to the communication terminal 2.

In this manner, the base station 1 according to the present embodiment is capable of selectively using the DRS and the SRS which are usable for the array transmission control with efficiency.

It should be noted that the adjustment constants Cd and Cu for use in determining the downlink priority DM and the threshold value α are determined by simulations and the like so that the transmission and reception throughputs of the base station 1 are as high as possible and so that the amount of uplink communication data and the amount of downlink communication data between the plurality of communication terminals 2 connected to the base station 1 are as equitable as possible.

<Various Modifications>

Various modifications of the base station 1 according to the present embodiment will be described hereinafter.

<First Modification>

In the aforementioned example, only when it is judged that there is a high likelihood that the SRS is used for the array transmission control for a communication terminal 2, that is, as the need arises, the communication terminal 2 is caused to transmit the SRS. Instead, all of the communication terminals 2 connected to the base station 1 may be caused to always transmit the SRS, as mentioned above. In this case, the base station 1 transmits the SRS control data including the transmission start data to a communication terminal 2 as soon as the communication terminal 2 is connected to the base station 1.

In this manner, in the case where all of the communication terminals 2 connected to the base station 1 always transmit the SRS, the target communication terminal 2 transmits the SRS whenever the scheduling of the radio resources for the target communication terminal 2 is performed. Thus, it is not necessary that the allocation of the downlink radio resource to the target communication terminal 2 is not executed until the target communication terminal 2 transmits the SRS, but the downlink communication with the target communication terminal 2 may be performed immediately.

<Second Modification>

When performing the downlink communication with the target communication terminal 2 in the scheduling target time period 550, the base station 1 may perform the downlink communication with the target communication terminal 2 without effecting the array transmission control in the case where it is determined that the SRS is used for the array transmission control for the target communication terminal 2 but the target communication terminal 2 is not transmitting the SRS in the scheduling target time period 550. That is, the base station 1 may omni-transmit the transmission signal to the target communication terminal 2 in this case.

As mentioned above, the accuracy of the array transmission control is decreased, when the time at which the target communication terminal 2 transmits the SRS is significantly remote from the time at which the base station 1 effects the array transmission control for the target communication terminal 2, based on the SRS. Thus, in such a case, the base station 1 may perform omni-communication with the target communication terminal 2, so that the target communication terminal 2 receives the transmission signal from the base station 1 with reliability.

<Third Modification>

When the base station 1 schedules the radio resources in the scheduling target time period 550, the downlink radio resource may not be allocated to a communication terminal 2 which is determined so that the SRS is used for the array transmission control and which is not transmitting the SRS in the scheduling target time period 550. That is, in the communication terminal 2 to be subjected to the downlink communication, the communication terminal 2 which is not transmitting the SRS in the scheduling target time period 550 and in which it is determined that the SRS is used for the array transmission control may be excepted from the communication terminals 2 to be subjected to the scheduling of the downlink radio resources. This suppresses the low-accuracy array transmission control effected in the base station 1. Thus, the provision of interference waves to the peripheral devices of the base station 1 is suppressed.

<Fourth Modification>

In the aforementioned example, it is determined that the SRS is used for the array transmission control for a communication terminal 2 without any condition when the downlink priority DM for the communication terminal 2 in the scheduling target time period 550 is lower than the threshold value α. In such a case, it may be determined that the SRS is used for the array transmission control for the communication terminal 2 only when the communication terminal 2 transmits the SRS in the scheduling target time period 550. This suppresses the low-accuracy array transmission control effected in the base station 1.

Specifically, it is determined that the SRS is used for the array transmission control for a communication terminal 2 when the downlink priority DM for the communication terminal 2 in the scheduling target time period 550 is lower than the threshold value α and when the communication terminal 2 transmits the SRS in the scheduling target time period 550.

It is also determined that the DRS is used for the array transmission control for a communication terminal 2 when the downlink priority DM for the communication terminal 2 in the scheduling target time period 550 is lower than the threshold value α, when the communication terminal 2 does not transmit the SRS in the scheduling target time period 550 and when the communication terminal 2 has transmission-waiting data to be transmitted to the base station 1.

The omni-transmission is performed for the downlink communication with a communication terminal 2 or no downlink radio resource is allocated to the communication terminal 2, when the downlink priority DM for the communication terminal 2 in the scheduling target time period 550 is lower than the threshold value α, when the communication terminal 2 does not transmit the SRS in the scheduling target time period 550 and when the communication terminal 2 has no transmission-waiting data to be transmitted to the base station 1.

Also in the aforementioned example, it is determined that the SRS is used for the array transmission control for a communication terminal 2 without any condition when the downlink priority DM for the communication terminal 2 in the scheduling target time period 550 is not less than the threshold value α but when the communication terminal 2 has no transmission-waiting data to be transmitted to the base station 1. In such a case, it may be similarly determined that the SRS is used for the array transmission control for the communication terminal 2 only when the communication terminal 2 transmits the SRS in the scheduling target time period 550. This suppresses the low-accuracy array transmission control effected in the base station 1. On the other hand, the omni-transmission is performed for the downlink communication with a communication terminal 2 or no downlink radio resource is allocated to the communication terminal 2, when the downlink priority DM for the communication terminal 2 in the scheduling target time period 550 is not less than the threshold value α, when the communication terminal 2 has no transmission-waiting data to be transmitted to the base station 1 and when the communication terminal 2 does not transmit the SRS in the scheduling target time period 550.

<Fifth Modification>

For the downlink communication with the target communication terminal 2, the array transmission control is effected based on the SRS transmitted from the target communication terminal 2 as close to the downlink communication as possible in timing, thereby allowing the beam to be appropriately directed toward the target communication terminal 2 while ensuring the flexibility of the allocation of the uplink radio resources. When the target communication terminal 2 transmits the SRS in the scheduling target time period 550, it is hence desirable that the target communication terminal 2 is determined to be subjected to the downlink communication in the scheduling target time period 550 and that it is judged that the SRS is used for the array transmission control for the target communication terminal 2.

Thus, the present modification devises the downlink priority DM and the threshold value α to allow a communication terminal 2 which transmits the SRS in the scheduling target time period 550 to be easily subjected to the downlink communication in the scheduling target time period 550 and to allow the SRS to be easily used for the array transmission control for the communication terminal 2.

The downlink priority DM for the target communication terminal 2 according to the present modification is expressed by Equation (6) below.

$$DM=F(pDM,UM,S) \quad (6)$$

where S is the SRS transmission bandwidth for the SRS transmitted by the target communication terminal 2, and F(A, B,C) represents a function the value of which increases when all A, B and C increase. In other words, F(A,B,C) represents a function the value of which increases when at least one of A, B and C increases but the remainder is not changed. For example, Equation (7) below may be used for F(pDM,UM,S).

$$DM=F(pDM,UM,S)=pDM^{Cd} \times UM^{Cu} \times S^{Cs} \quad (7)$$

where Cd, Cu and Cs are adjustment constants and have values greater than zero. It should be noted that, when there is no transmission-waiting data to be transmitted by the target communication terminal 2 in the scheduling target time period 550, the downlink priority DM is determined as an exception assuming that Cu=0. Also, when the target communication terminal 2 does not transmit the SRS in the scheduling target time period 550, the downlink priority DM is determined as an exception assuming that Cs=0. The downlink priority DM according to the present modification obtained when the target communication terminal 2 does not transmit the SRS in the scheduling target time period 550 is equal to that in Equation (4) mentioned above.

As indicated in Equation (7), the downlink priority DM for the target communication terminal 2 increases with an increase in the uplink priority UM for the target communication terminal 2, and increases when the target communication terminal 2 transmits the SRS in the scheduling target time period 550. Further, the downlink priority DM for the target communication terminal 2 increases with an increase in the SRS transmission bandwidth for the SRS transmitted by the target communication terminal 2 in the scheduling target time period 550.

Also, the threshold value α for comparison with the downlink priority DM for the target communication terminal 2 is expressed by Equation (8) below.

$$\alpha = W(S) \quad (8)$$

where W(S) is a function the value of which increases with an increase in the value of S. For example, Equation (9) below may be used for W(S).

$$\alpha = W(S) = CCs \times S + As \quad (9)$$

where CCs and As are adjustment constants and have values greater than zero. It should be noted that, when the target communication terminal 2 does not transmit the SRS in the scheduling target time period 550, the threshold value α is determined as an exception assuming that CCs=0. The threshold value α according to the present modification obtained when the target communication terminal 2 does not transmit the SRS in the scheduling target time period 550 is equal to the threshold value α according to the aforementioned embodiment.

As described above, it is determined in the present modification that the downlink priority DM for the target communication terminal 2 in the scheduling target time period 550 increases when the target communication terminal 2 transmits the SRS in the scheduling target time period 550. This allows the target communication terminal 2 which transmits the SRS in the scheduling target time period 550 to be easily subjected to the downlink communication in the scheduling target time period 550.

In the present modification, the threshold value α for comparison with the downlink priority DM for the target communication terminal 2 in the scheduling target time period 550 is increased when the target communication terminal 2 transmits the SRS in the scheduling target time period 550. This allows the SRS to be easily determined to be used for the array transmission control for the target communication terminal 2 which transmits the SRS in the scheduling target time period 550.

In this manner, a communication terminal 2 according to the present modification is easily determined to be subjected to the downlink communication in the scheduling target time period 550 when the communication terminal 2 transmits the SRS in the scheduling target time period 550. In addition, the SRS is easily determined to be used for the array transmission control for the communication terminal 2. This allows the beam to be appropriately directed toward the communication terminal 2 while ensuring the flexibility of the allocation of the uplink radio resource to the communication terminal 2. This improves the quality of communication between the base station 1 and the communication terminal 2.

Also, in the present modification, it is determined that the downlink priority DM for a communication terminal 2 in the scheduling target time period 550 increases with an increase in the SRS transmission bandwidth for the STS transmitted by the communication terminal 2 in the scheduling target time period 550. In addition, the threshold value α for comparison with the downlink priority DM is increased with an increase in the SRS transmission bandwidth. Thus, as the SRS transmission bandwidth increases, the communication terminal 2 is more easily determined to be subjected to the downlink communication in the scheduling target time period 550, and the SRS is more easily determined to be used in the array transmission control for the communication terminal 2. This allows the beam to be appropriately directed toward the communication terminal 2 while ensuring the flexibility of the allocation of the uplink radio resource to the communication terminal 2. Also, the flexibility of the allocation of the downlink radio resource is improved.

It should be noted that the adjustment constants Cd, Cu and Cs for use in determining the downlink priority DM and the adjustment constants CCs and As for use in determining the threshold value α are determined by simulations and the like so that the transmission and reception throughputs of the base station 1 are as high as possible and so that the amount of uplink communication data and the amount of downlink communication data between the plurality of communication terminals 2 connected to the base station 1 are as equitable as possible.

<Sixth Modification>

In the aforementioned example, only the DRS is necessarily used for the array transmission control for a communication terminal 2, when the downlink priority DM for the communication terminal 2 in the scheduling target time period 550 is higher than the threshold value α and when the communication terminal 2 has transmission-waiting data to be transmitted to the base station 1 (more precisely, when the downlink priority DM for the communication terminal 2 is not less than the threshold value α and when the communication terminal 2 has transmission-waiting data to be transmitted to the base station 1; because it is determined that the DRS is used for the array transmission control in the case where the downlink priority DM is equal to the threshold value α, in the aforementioned example). However, only the DRS may be used for the array transmission control when the communication terminal 2 does not transmit the SRS having a frequency band greater than a second threshold value in the scheduling target time period 550, and at least one of the DRS and the SRS may be used when the communication terminal 2 transmits the aforementioned SRS. That is, when the communication terminal 2 transmits the SRS having a frequency band greater than the second threshold value in the scheduling target time period 550, the use signal determining section 126 may determine to use only the DRS, to use only the SRS or to use both the DRS and SRS for the array transmission control for the communication terminal 2.

FIG. 16 is a diagram showing that the base station 1 effects the array transmission control by using both the DRS and SRS when performing the downlink communication with the target communication terminal 2 having the terminal number 1 which transmits the SRS having a frequency band greater than the second threshold value in the scheduling target time period 550 in the case where the downlink priority DM for the target communication terminal 2 in the scheduling target time period 550 is not less than the threshold value α and the target communication terminal 2 has transmission-waiting data to be transmitted to the base station 1.

In the example shown in FIG. 16, the downlink radio resource having a frequency band 621 coinciding with a frequency band 620 of the uplink radio resource for transmission of the DRS and the downlink radio resource having a frequency band 622 coinciding with the SRS transmission band 450 of the SRS transmitted by the target communication terminal 2 are allocated to the target communication terminal 2 having the terminal number 1. For the transmission of a signal to the target communication terminal 2 by using the downlink radio resource having the frequency band 621 coinciding with the frequency band 620 of the uplink radio resource, the array transmission control is effected based on the DRS transmitted by the target communication terminal 2 by using part of the uplink radio resource. For the transmission of a signal to the target communication terminal 2 by using the downlink radio resource having the frequency band 622 coinciding with the SRS transmission band 450, on the other hand, the array transmission control is effected based on the SRS transmitted by the target communication terminal 2.

In LTE, the minimum value of the value that can be set as the SRS transmission bandwidth is the width of the frequency band comprised of four allocation unit bands (180 kHz×4). Thus, when the second threshold value is set to a value not greater than the width of the frequency band comprised of the four allocation unit bands, a communication terminal 2 necessarily transmits the SRS having a frequency band greater than the second threshold value in the scheduling target time period 550, independently of the frequency band of the SRS, so far as the communication terminal 2 transmits the SRS in the scheduling target time period 550. That is, at least one of the DRS and the SRS may be used for the array transmission control for a communication terminal 2, when the downlink priority DM for the communication terminal 2 in the scheduling target time period 550 is higher than the threshold value α, when the communication terminal 2 has transmission-waiting data to be transmitted to the base station 1, and when the communication terminal 2 transmits the SRS in the scheduling target time period 550 (independently of the frequency band of the SRS).

<Seventh Modification>

The known signal for use in the array transmission control in the scheduling target time period 550 may be determined as the DRS independently of the downlink priority DM, when a communication terminal 2 does not transmit the SRS in the scheduling target time period 550. However, when the communication terminal 2 has no transmission-waiting data to be transmitted to the base station 1, it is determined that the SRS is used for the array transmission control for the communication terminal 2 even if the communication terminal 2 does not transmit the SRS in the scheduling target time period 550.

In the aforementioned fifth modification, the adjustment constant As for use in determining the threshold value α for the target communication terminal 2 is set to zero, whereby the known signal for use in the array transmission control for the target communication terminal 2 in the scheduling target time period 550 is determined as the DRS, independently of the downlink priority DM for the target communication terminal 2, when the target communication terminal 2 does not transmit the SRS in the scheduling target time period 550.

Setting the adjustment constant As for use in determining the threshold value α for the target communication terminal 2 to zero causes the threshold value α for the target communication terminal 2 to become zero when the target communication terminal 2 does not transmit the SRS in the scheduling target time period 550. Thus, when the target communication terminal 2 has transmission-waiting data to be transmitted to the base station 1, it is determined that the DRS is used for the array transmission control for the target communication terminal 2, independently of the downlink priority DM.

On the other hand, when the target communication terminal 2 transmits the SRS in the scheduling target time period 550, the threshold value α for the target communication terminal 2 does not become zero, so that the known signal for use in the array transmission control for the target communication terminal 2 is determined by the result of comparison between the threshold value α and the downlink priority DM for the target communication terminal 2.

<Eighth Modification>

For the downlink communication in the scheduling target time period 550 with the target communication terminal 2 which transmits the SRS having a frequency band greater than a third threshold value in the scheduling target time period 550, the array transmission control may be effected necessarily based on the SRS from the target communication terminal 2. In this case, the known signal for use in the array transmission control for the target communication terminal is not determined based on the downlink priority DM for the target communication terminal 2, but the known signal for use in the array transmission control is determined depending on whether the target communication terminal 2 transmits the SRS having a frequency band greater than the third threshold value in the scheduling target time period 550 or not. Specifically, the known signal for use in the array transmission control is determined as the SRS when the target communication terminal 2 transmits the SRS having a frequency band greater than the third threshold value in the scheduling target time period 550, and the known signal for use in the array transmission control is determined as the DRS when the target communication terminal 2 does not transmit the SRS. The known signal for use in the array transmission control is determined as the SRS when the target communication terminal 2 does not transmit the SRS in the scheduling target time period 550 but the target communication terminal 2 has no transmission-waiting data to be transmitted to the base station 1.

In this manner, when a communication terminal 2 transmits the SRS having a frequency band greater than the third threshold value in the scheduling target time period 550, the known signal for use in the array transmission control is determined as the SRS. Thus, the base station 1 effects the array transmission control, based on the SRS transmitted by the communication terminal 2 in the scheduling target time period when performing the downlink communication with the communication terminal 2 in the scheduling target time period. In this case, the array transmission control is effected based on the SRS transmitted from the communication terminal 2 as close to the downlink communication with the communication terminal 2 as possible in timing, while the flexibility of the allocation of the uplink radio resource to the communication terminal 2 is ensured. Therefore, the communication performance of the base station 1 is improved.

On the other hand, when a communication terminal 2 does not transmit the SRS having a frequency band greater than the third threshold value in the scheduling target time period 550, the known signal for use in the array transmission control is determined as the DRS. Thus, when performing the downlink communication with the communication terminal 2 in the scheduling target time period, the base station 1 allocates the uplink radio resource to the communication terminal 2 to effect the array transmission control, based on the DRS transmitted from the communication terminal 2 by using part of the uplink radio resource. In this case, the array transmission control is effected based on the DRS transmitted from the communication terminal 2 as close to the downlink communication with the communication terminal 2 as possible in timing. Therefore, the communication performance of the base station 1 is improved.

In this manner, the DRS and the SRS usable for the array transmission control are selectively used with efficiency in the present modification.

In LTE, the minimum value of the value that can be set as the SRS transmission bandwidth is the width of the frequency band comprised of four allocation unit bands (180 kHz×4), as mentioned above. Thus, when the third threshold value is set to a value not greater than the width of the frequency band comprised of the four allocation unit bands, a communication terminal 2 necessarily transmits the SRS having a frequency band greater than the third threshold value in the scheduling target time period 550, independently of the frequency band of the SRS, so far as the communication terminal 2 transmits the SRS in the scheduling target time period 550. Specifically, the known signal for use in the array transmission control may be determined as the SRS when the target communication terminal 2 transmits the SRS in the scheduling target time period 550, independently of the frequency band of the SRS, and the known signal for use in the array transmission control may be determined as the DRS when the target communication terminal 2 does not transmit the SRS.

In the present modification, the downlink radio resources may be scheduled by using the downlink priority DM as in the aforementioned embodiment. Alternatively, the downlink radio resources may be scheduled by using the tentative downlink priority pDM in place of the downlink priority DM. That is, the downlink priority for use in the scheduling of the downlink radio resources and the uplink priority for use in the scheduling of the uplink radio resources may be determined independently of each other.

<Other Modifications>

Although the present invention is applied to LTE in the aforementioned examples, the present invention may be applied to other communication systems.

While the invention has been described in detail, the foregoing description is in all aspects illustrative and not restrictive. It is understood that numerous other modifications and variations which have not been illustrated can be devised without departing from the scope of the invention.

REFERENCE SIGNS LIST

1 Base station
2 Communication terminals
13 Communication section
110a Antennas
122 Scheduling executing section
125 Transmission mode determining section
126 Use signal determining section
360 SRS transmission cycle
450 SRS transmission band
550 Scheduling target time period

The invention claimed is:

1. A base station for communicating with communication terminals, comprising:
   a communication section for communicating with a plurality of communication terminals by using a plurality of antennas, the communication section controlling a transmission directivity of the plurality of antennas, based on known signals from the plurality of communication terminals when performing downlink communications with the plurality of communication terminals,
   a scheduling executing section for determining, from the plurality of communication terminals, any communication terminals performing uplink communication of data and any communication terminals performing downlink communication of data in a scheduling target time period including an uplink communication time period and a downlink communication time period, and for allocating an uplink radio resource for use in communication with each communication terminal performing uplink communication of data to each communication terminal performing uplink communication of data and allocating a downlink radio resource for use in communication with each communication terminal performing downlink communication of data to each communication terminal performing downlink communication of data, said known signal including first and second known signals, said first known signal being transmitted using part of a data uplink radio resource allocated to a respective communication terminal, performing uplink communication of data, as the uplink radio resource which the communication terminal performing uplink communication of data uses for data transmission, said second known signal being transmitted using an uplink radio resource usable for the transmission of said second known signal and determined separately from said data uplink radio resource,
   a transmission mode determining section for determining a transmission frequency band and a transmission cycle of said second known signal for one or more of the plurality of communication terminals, and
   a use signal determining section for determining the known signal which the communication section uses for the control of the transmission directivity of the plurality of antennas in said scheduling target time period from among said first and second known signals,
   wherein, upon receipt of notification about the transmission frequency band and the transmission cycle of said second known signal from said base station, each of the plurality of communication terminals is configured to transmit response data to the notification to said base station, and thereafter transmit said second known signal, based on the transmission frequency band and the transmission cycle,
   wherein said scheduling executing section determines an uplink priority which is a priority of uplink communication for each communication terminal performing uplink communication of data, and determines one or more of the communication terminals performing uplink communication of data in said scheduling target time period based on the uplink priority,
   wherein said scheduling executing section determines a downlink priority which is the priority of downlink communication for each communication terminal performing downlink communication of data so that the downlink priority increases with an increase in said uplink priority for that communication terminal, and determines one or more of the communication terminals performing downlink communication of data in said scheduling target time period based on the downlink priority,
   wherein, for each communication terminal performing downlink communication of data, when said downlink priority for the communication terminal is higher than a threshold value, said use signal determining section determines said known signal which the communication section uses for the control of the transmission directivity of the plurality of antennas during the downlink communication with the communication terminal in said scheduling target time period as said first known signal,
   wherein, for each communication terminal performing downlink communication of data, when said downlink priority for the communication terminal is lower than said threshold value, said use signal determining section determines said known signal which the communication section uses for the control of the transmission directivity of the plurality of antennas during the downlink communication with the communication terminal in said scheduling target time period as said second known signal,
   wherein, for each communication terminal performing downlink communication of data, when said first known signal is determined to be used for the control of the transmission directivity of said plurality of antennas for the communication terminal determined to perform downlink communication in said scheduling target time period, said scheduling executing section determines to perform uplink communication with the communication terminal in said scheduling target time period without using said uplink priority for the communication terminal, and wherein, for each communication terminal performing downlink communication of data, when said second known signal is determined to be used for the control of the transmission directivity of said plurality of antennas for the communication terminal determined to perform downlink communication in said scheduling target time period, said scheduling executing section determines whether or not to perform uplink communication with the communication terminal in said scheduling target time period by using said uplink priority for the communication terminal.

2. The base station according to claim 1,
wherein, for each communication terminal performing downlink communication of data, when said second known signal is determined to be used for the control of the transmission directivity of said plurality of antennas for a communication terminal determined to perform downlink communication in said scheduling target time period and when the communication terminal transmits said second known signal in said scheduling target time period, the communication section controls the transmission directivity of said plurality of antennas, based on said second known signal from the communication terminal during the downlink communication with the communication terminal in said scheduling target time period, and
wherein, for each communication terminal performing downlink communication of data, when said second known signal is determined to be used for the control of the transmission directivity of said plurality of antennas for the communication terminal determined to perform downlink communication in said scheduling target time period and when the communication terminal does not transmit said second known signal in said scheduling target time period, the communication section performs omni-communication without controlling the transmission directivity of said plurality of antennas during the downlink communication with the communication terminal in said scheduling target time period.

3. The base station according to claim 1, wherein, when any one of the plurality of communication terminals, determined so that said second known signal is used for the control of transmission directivity of said plurality of antennas, does not transmit said second known signal in said scheduling target time period, said scheduling executing section determines that the downlink communication is not performed with the communication terminal in said scheduling target time period, independently of said downlink priority for the communication terminal.

4. The base station according to claim 1, wherein, for each communication terminal performing downlink communication of data, in the case where said downlink priority for the communication terminal is lower than said threshold value, said use signal determining section determines said known signal which the communication section uses for the control of the transmission directivity of the plurality of antennas during the downlink communication with the communication terminal in said scheduling target time period as said second known signal only when the communication terminal transmits said second known signal in said scheduling target time period.

5. The base station according to claim 1, wherein, for each communication terminal performing downlink communication of data, said scheduling executing section determines said downlink priority for the communication terminal so that said downlink priority increases with an increase in said uplink priority for the communication terminal and so that said downlink priority increases when the communication terminal transmits said second known signal in said scheduling target time period, and increases said threshold value when the communication terminal transmits said second known signal in said scheduling target time period.

6. The base station according to claim 5, wherein, for each communication terminal performing downlink communication of data, said scheduling executing section determines said downlink priority for the communication terminal so that said downlink priority increases with an increase in said uplink priority for the communication terminal and so that said downlink priority increases with an increase in the frequency band of the second known signal when the communication terminal transmits said second known signal in said scheduling target time period, and increases said threshold value with an increase in the frequency band of the second known signal when the communication terminal transmits said second known signal in said scheduling target time period.

7. The base station according to claim 1,
wherein, for each communication terminal performing downlink communication of data, when said downlink priority for the communication terminal is higher than said threshold value and when the communication terminal transmits said second known signal having a frequency band higher than a second threshold value in said scheduling target time period, said use signal determining section determines not only said first known signal but also said second known signal as said known signal which the communication section uses for the control of the transmission directivity of the plurality of antennas during the downlink communication with the communication terminal in said scheduling target time period, and
wherein, for each communication terminal performing downlink communication of data, when said first and second known signals are determined to be used for the control of the transmission directivity of said plurality of antennas for the communication terminal determined to perform the downlink communication in said scheduling target time period, said scheduling executing section determines to perform the uplink communication with the communication terminal in said scheduling target time period without using said uplink priority for the communication terminal.

8. The base station according to claim 1, wherein, for each communication terminal performing downlink communication of data, when said downlink priority for the communication terminal is higher than said threshold value and when the communication terminal transmits said second known signal having a frequency band higher than a second threshold value in said scheduling target time period, said use signal determining section determines said known signal which the communication section uses for the control of the transmission directivity of the plurality of antennas during the downlink communication with the communication terminal in said scheduling target time period as said second known signal.

9. The base station according to claim 1, wherein, for each communication terminal performing downlink communication of data, when said second known signal is not transmitted in said scheduling target time period, said use signal determining section determines said known signal which the communication section uses for the control of the transmission directivity of the plurality of antennas during the downlink communication with the communication terminal in said scheduling target time period as said first known signal, independently of said downlink priority for the communication terminal.

10. A base station for communicating with communication terminals, comprising:
- a communication section for communicating with a plurality of communication terminals by using a plurality of antennas, the communication section controlling a transmission directivity of the plurality of antennas, based on known signals from the plurality of communication terminals when performing downlink communications with the plurality of communication terminals,
- a scheduling executing section for determining, from the plurality of communication terminals, any communication terminals performing uplink communication of data therewith and any communication terminals performing downlink communication of data therewith in a scheduling target time period including an uplink communication time period and a downlink communication time period, and for allocating an uplink radio resource for use in communication with each communication terminals performing uplink communication of data therewith to each communication terminal performing uplink communication of data therewith and allocating a downlink radio resource for use in communication with each communication terminal performing downlink communication of data therewith to each communication terminal performing downlink communication of data therewith, said known signal including first and second known signals, said first known signal being transmitted using part of a data uplink radio resource allocated to a respective communication terminal, performing uplink communication of data, as the uplink radio resource which the communication terminal uses for data transmission, said second known signal being transmitted using an uplink radio resource usable for the transmission of said second known signal and determined separately from said data uplink radio resource,
- a transmission mode determining section for determining the transmission frequency band and the transmission cycle of said second known signal for one or more of the plurality of communication terminals, and
- a use signal determining section for determining the known signal which the communication section uses for the control of the transmission directivity of the plurality of antennas in said scheduling target time period from among said first and second known signals,
- wherein, upon receipt of notification about the transmission frequency band and the transmission cycle of said second known signal from said base station, each of the plurality of communication terminals is configured to transmit response data to the notification to said base station, and thereafter transmit said second known signal, based on the transmission frequency band and the transmission cycle,
- wherein said scheduling executing section determines an uplink priority which is a priority of uplink communication for each communication terminal performing uplink communication of data, and determines one or more of the communication terminals performing uplink communication of data in said scheduling target time period, based on the uplink priority,
- wherein said scheduling executing section determines a downlink priority which is the priority of downlink communication for each communication terminal performing downlink communication of data, and determines one or more of the communication terminals performing downlink communication of data in said scheduling target time period, based on the downlink priority,
- wherein, for each communication terminal performing downlink communication of data, when the communication terminal does not transmit said second known signal having a frequency band higher than a threshold value in said scheduling target time period, said use signal determining section determines said known signal which the communication section uses for the control of the transmission directivity of the plurality of antennas during the downlink communication with the communication terminal as said first known signal,
- wherein, for each communication terminal performing downlink communication of data, when the communication terminal transmits said second known signal having a frequency band higher than said threshold value in said scheduling target time period, said use signal determining section determines said known signal which the communication section uses for the control of the transmission directivity of the plurality of antennas during the downlink communication with the communication terminal as said second known signal,
- wherein, for each communication terminal performing downlink communication of data, when said first known signal is determined to be used for the control of the transmission directivity of said plurality of antennas for the communication terminal determined to perform downlink communication in said scheduling target time period, said scheduling executing section determines to perform uplink communication with the communication terminal in said scheduling target time period without using said uplink priority for the communication terminal, and
- wherein, for each communication terminal performing downlink communication of data, when said second known signal is determined to be used for the control of the transmission directivity of said plurality of antennas for the communication terminal determined to perform downlink communication in said scheduling target time period, said scheduling executing section determines whether or not to perform uplink communication with the communication terminal in said scheduling target time period by using said uplink priority for the communication terminal.

11. The base station according to claim 10, wherein, for each communication terminal performing downlink communication of data, said scheduling executing section determines said downlink priority for the communication terminal so that said downlink priority increases with an increase in said uplink priority for the communication terminal.

* * * * *